(12) United States Patent
Cheng-Shorland et al.

(10) Patent No.: US 12,135,808 B2
(45) Date of Patent: Nov. 5, 2024

(54) DISSEMINATION AND TRACKING OF DOCUMENTS WITH DOWNSTREAM CONTROL

(71) Applicant: ShelterZoom Corp., New York, NY (US)

(72) Inventors: Chao Cheng-Shorland, New York, NY (US); Amir Homayoun Alishahi, New York, NY (US)

(73) Assignee: ShelterZoom Corp., New York, NY (US)

( * ) Notice: Subject to any disclaimer, the term of this patent is extended or adjusted under 35 U.S.C. 154(b) by 75 days.

(21) Appl. No.: 17/352,568

(22) Filed: Jun. 21, 2021

(65) Prior Publication Data

US 2022/0405409 A1    Dec. 22, 2022

(51) Int. Cl.
| | |
|---|---|
| *G06F 21/62* | (2013.01) |
| *G06F 16/93* | (2019.01) |
| *G06F 21/31* | (2013.01) |
| *G06F 21/64* | (2013.01) |
| *G06K 19/06* | (2006.01) |

(52) U.S. Cl.
CPC .......... *G06F 21/6209* (2013.01); *G06F 16/94* (2019.01); *G06F 21/31* (2013.01); *G06F 21/64* (2013.01); *G06K 19/06037* (2013.01); *G06F 2221/2141* (2013.01)

(58) Field of Classification Search
CPC ...... G06F 21/6209; G06F 16/94; G06F 21/31; G06F 21/64; G06F 2221/2141; G06F 2221/0737; G06K 19/06037
See application file for complete search history.

(56) References Cited

U.S. PATENT DOCUMENTS

| | | | | |
|---|---|---|---|---|
| 10,628,631 B1* | 4/2020 | Smuda | ................. | G06F 40/14 |
| 10,931,670 B1* | 2/2021 | Roturier | ............... | G06F 16/955 |
| 11,475,230 B1* | 10/2022 | Raina | .................... | H04W 4/021 |
| 2003/0023695 A1* | 1/2003 | Kobata | .................. | H04L 51/23 |
| | | | | 709/206 |
| 2015/0213236 A1* | 7/2015 | Gorodyansky | ......... | G06F 21/10 |
| | | | | 726/28 |
| 2019/0340369 A1* | 11/2019 | Hadi | ...................... | G06V 40/33 |
| 2021/0194975 A1* | 6/2021 | Comstock | ............. | H04L 67/535 |

* cited by examiner

*Primary Examiner* — Wasika Nipa
*Assistant Examiner* — Andrew Suh
(74) *Attorney, Agent, or Firm* — Sterne, Kessler, Goldstein & Fox P.L.L.C.

(57) ABSTRACT

Disclosed herein are system, method, and computer program product embodiments for managing the dissemination of documents using downstream control. A document linking system may facilitate the creation of a document link, graphical document link, and/or a corresponding document token. This link may be distributed downstream via messages, emails, or other applications. The document linking system may track document interactions, trace locations, and/or control individualized downstream access. The document linking system may provide instructions to a document delivery system to integrate a plugin or widget into its corresponding application (e.g., a messaging or email application). A user using the application may select a GUI object to access the document linking system and generate a document link. This link may then be embedded into a message or email and disseminated. The document linking system may also generate graphical document links that may be scanned with a camera to access the document.

20 Claims, 23 Drawing Sheets

DISSEMINATION AND TRACKING OF DOCUMENTS WITH DOWNSTREAM CONTROL

BACKGROUND

Field

This field is generally related to document linking, modification, tracking, tracing and dissemination and their applications to create, deliver, track, trace and disseminate documents.

Related Art

As individuals, businesses, and governments interact, parties often exchange many documents to communicate, or transfer files and records from one party to another, or from one system to another. These documents may include informational documents for acknowledgement or may be contractual obligations. As documents are disseminated, however, the continued spread of the documents may become difficult to manage. For example, tracking viewership of the document and/or modifications to the document may be uncontrollable. This may become difficult when there are multiple parties viewing or modifying the document. For example, a document owner may send a document to an intended recipient, but the intended recipient may further forward that document to another individual. In this case, the document owner may be unable to control or track the continued distribution of the document beyond the party originally intended to receive the document. Encrypting and preserving a true record of views or modifications may also be difficult when using unsecure technology such as electronic mail or social media posting.

BRIEF SUMMARY

Disclosed herein are system, apparatus, device, method and/or computer program product embodiments, and/or combinations and sub-combinations thereof, for managing the dissemination of documents using downstream control.

The embodiments disclosed herein may provide a plugin or widget which may be integrated into a document delivery system such as an email system, a business application, a social media channel, a website, and/or a chat or messaging system. By using the plugin or widget, a user accessing the document delivery system may use a front-end user interface for providing a document to a back-end system for managing documents. The front-end interface may be accessed via a plugin or widget integrated into an application managed by a document delivery system. For example, the application may be a messaging application managed by a messaging system. By integrating the plugin or widget into various document delivery systems, users using those document delivery systems may gain access to the back-end management of documents. This back-end system may allow a user to manage document creation, document uploads, document permissions, document modifications from different parties, and/or view a document flow tracking the dissemination of the document. Based on this flow, a document owner may modify and/or adjust permissions corresponding to the document.

The back-end system may be a document linking system that generates and/or manages document links. In some embodiments, the document linking system may also use a document token process. As will be further explained below, document tokens may be used to represent ownership and/or permissions corresponding to a document. In some embodiments, a document token may be a non-fungible token (NFT). The document linking system may receive an uploaded document and/or aid the user in generating a document for dissemination. Upon receiving or generating a document, the document linking system may generate a document token corresponding to the document. As will be further described below, the document token may be a hash of the document and/or may be used to track document modifications, acknowledgments, and/or permissions. Upon generating the document token, document linking system may transmit the document tokens as links to document delivery systems. The document delivery systems may then embed the document links into messages for a user to transmit. This may allow users to disseminate documents managed by the document linking system.

An intended recipient may then receive the document link via a document delivery system corresponding to the intended recipient. Upon accessing the link, the user may supply credentials to the document linking system. In some embodiments, the document delivery system implementing the plugin from the document linking system may implement a single sign-on process to provide credentials to the document linking system. The document linking system may track or log the access to the document based on the document link. This tracking may be performed using a document flow data structure. The document owner may view this document flow data structure to identify downstream individuals accessing the document and/or to manage permissions for these downstream individuals. In this manner, the document owner may view and/or manage downstream permissions even if a document link is distributed beyond an initial intended recipient. In some embodiments, the document flow data structure may also track document participants and/or events such as creation, viewing, signing, sharing or downloading. The document flow data structure may also track times, dates, and/or locations like the latitude and longitude of digitally transmitted information. For example, the document flow data structure may track global positioning coordinates related to a document and/or a document interaction event.

The document linking system may track access and/or modifications of the document. In some embodiments, the modifications may be to the text of the document. In some embodiments, the modifications may be an acknowledgement and/or a signature corresponding to the document. For example, the acknowledgement may acknowledge receipt of the document. In this manner, dissemination may occur to downstream users while keeping a record of users accessing and/or modifying the document. Integrating this process with existing document delivery systems may also provide a more streamlined process for managing, sharing, and/or modifying documents.

In some embodiments, the document linking system may manage documents in a database and generate links to database addresses. In some embodiments, the database may be a blockchain and the document linking system may manage documents using document tokens via a blockchain. The document tokens may correspond to generated documents and/or modifications of documents. The document tokens may be used with the blockchain to provide proof of a document creation or modification. For example, on either a public or private blockchain, new documents and/or modifications may be tracked as updated blocks and/or code executed on a blockchain using smart contract functions.

The publication to a blockchain may provide security and trust that modifications are immutable. Further, distributed ledger technology may provide a streamlined manner of tracking documents and/or modifications and presenting these documents to parties communicating and/or editing a document. As will be further described below, the embodiments described herein further provide faster and more efficient back-end processing for blockchain operations. In particular, the use of asynchronous calls to the blockchain may provide increased speed and may avoid delays related to blockchain transaction times.

The immutability of the blockchain may preserve documents and/or modifications to documents. Further, utilizing encryption may maintain confidentiality of sensitive information when disseminating documents. This may be useful for when a document is a contract. By managing these documents using a blockchain, parties to a contract may present offers and counteroffers that may be relied upon by other parties in a more trusted manner. For documents, the document linking system may streamline a document deliver in a manner that preserves confidentiality while maintaining a high degree of trust. Parties using the document linking system may provide digital signatures or acknowledgments as interactions with received documents. In this manner, the document linking system may facilitate the signing of a document. In some embodiments, the document generation and/or dissemination may be performed in a decentralized manner and/or may provide a decentralized document file system.

The plugin, widget, and/or graphical user interface may be implemented into document delivery systems to streamline the document generation, document delivery, and document dissemination process. The plugin may allow a user to quickly generate a document using fewer GUI interactions. The reduction of interactions may aid in reducing wasted computational resources or unnecessary web navigation. Further, the plugin may aid in reducing network traffic due to the reduced number of interactions. Similarly, the document upload and/or creation process while delivering document links may deliver documents in a similar and compact manner. Users accessing the link may access and/or interact with various documents via a number of different document delivery systems. In this manner, the document linking system may also reduce the number of user interactions and computational transactions while also reducing network traffic.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for managing the dissemination of documents using downstream control.

Various embodiments of these features will now be discussed with respect to the corresponding figures.

Figure 1A:
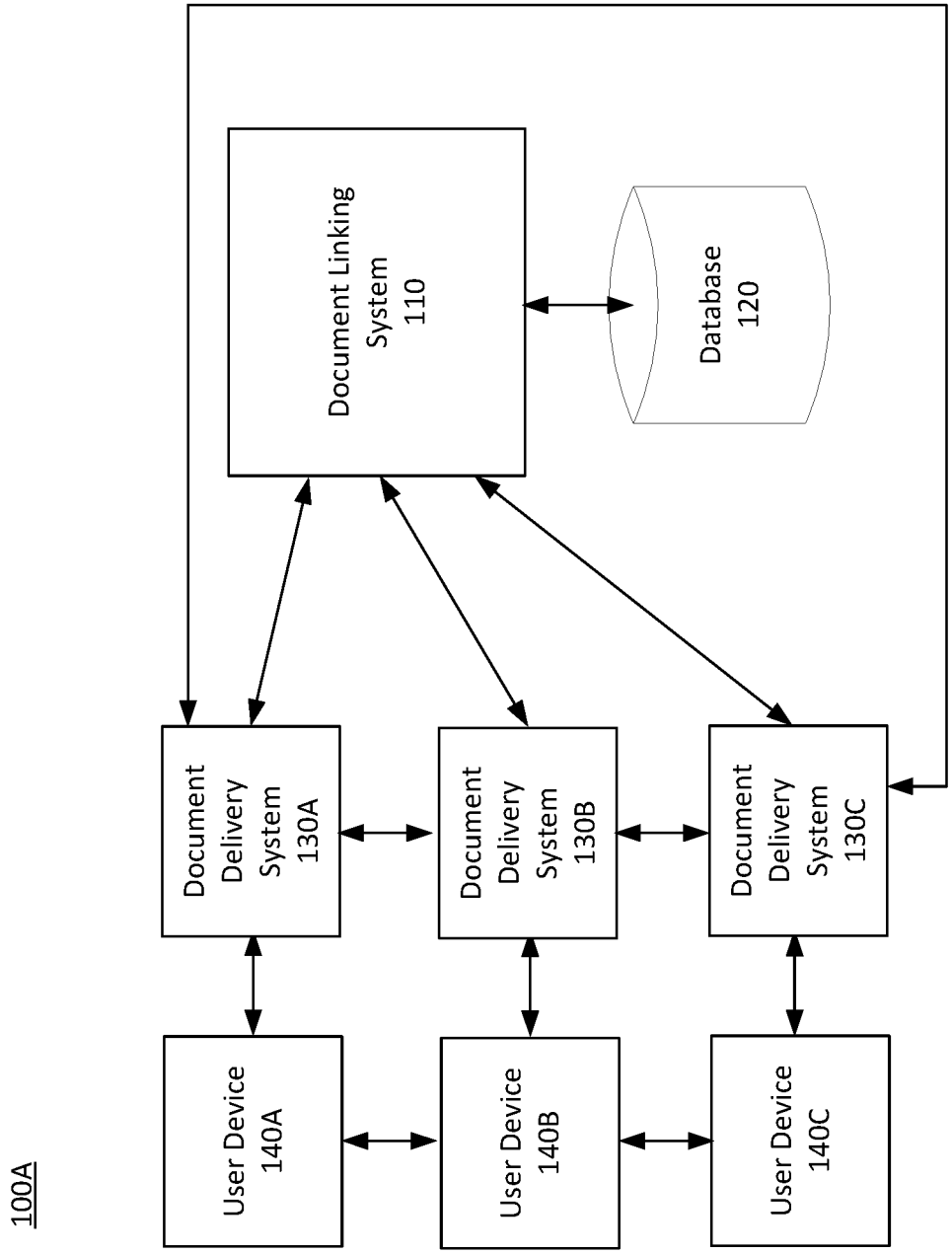
FIG. 1A depicts a block diagram of a document management environment, according to some embodiments.

FIG. 1A depicts a block diagram of a document management environment 100A, according to some embodiments.

Document management environment 100A may include document linking system 110, database 120, document delivery systems 130, and/or user devices 140. Document linking system 110 may include one or more servers and/or databases 120 that may communicate with document delivery systems 130A to 130C. Document delivery systems 130 may be servers and/or databases providing messaging platforms for user devices 140. For example, document delivery systems 130 may be email providers, social media providers, text message or SMS providers, blogs, and/or other systems that facilitate the delivery and/or receipt of messages for user devices 140. User device 140 may be a computer, laptop, tablet, phone, and/or other device that may access the Internet and/or access a document delivery system 130.

As will be further described below, document linking system 110 may provide software instructions, executable code, a software as a service (SaaS), and/or other programming to the document delivery systems 130 to provide a plugin or widget to be displayed on a graphical user interface. This plugin or widget may be integrated into a messaging service provided by a document delivery system 130. A user using a user device 140 may select this plugin or widget to access the document link and/or token generation managed by document linking system 110. User device 140 may provide a document to document linking system 110 via the plugin or widget. Document linking system 110 may generate document links and/or tokens based on documents received from or created by user devices 140. In some embodiments, document linking system 110 may preserve the document tokens using database 120. In some embodiments, database 120 may be a blockchain. After generating a document link and/or token, document linking system 110 may provide the document link and/or token to a document delivery system 130. This link may be embedded into a message being drafted by a user device 140. A document delivery system 130A may then provide the message including the document link to another document delivery system 130B to provide access to the document. As will be further explained below, document linking system 110 may track and/or log user credentials corresponding to user devices 140 that access, view, acknowledge, sign, and/or modify the document corresponding to the document link.

In some embodiments, user device 140A may be used to deliver a document to user device 140B. User device 140A may use document delivery system 130A to send the document via a message. Upon accessing document delivery system 130A, a user may provide a user selection on a graphical user interface (GUI) provided by document delivery system 130A to select the plugin or widget corresponding to document linking system 110. Based on this selection, document linking system 110 may generate another GUI allowing user device 140 to generate or supply a document for delivery as a document link.

Document linking system 110 may provide a front-end user interface to allow users to create, manage, edit, and/or modify documents. The user interface may be a graphical user interface (GUI) that may be accessed and/or displayed on a user device 140. Upon selecting the plugin or widget, user device 140 may use an application programming interface (API) to communicate with document linking system 110.

As will be further explained below, document linking system 110 may provide a front-end GUI including GUI elements allowing a user to create documents, modify documents, manage document permissions, generate links and/or messages corresponding to documents, manage document modifications from other parties, manage a digital wallet, manage user account information and/or account roles, and/or other document interactions. In some embodiments, document linking system 110 may facilitate the incorporation of GUI elements into a GUI implemented by document delivery system 130 to allow users to access the operations provided by document linking system 110. For example, document linking system 110 may provide a plugin or widget that may be incorporated, integrated, or overlaid onto a GUI generated by a document delivery system 130 to provide document linking and/or document token functionality.

In some embodiments, document linking system 110 may provide executable code and/or software instructions to a document delivery system 130 to generate an icon and/or button allowing a user to create or upload a document. The user may interact with the icon or button via a selection, press, or click on the GUI generated by the document delivery system 130. In response to this interaction, the document delivery system 130 may communicate with document linking system 110 to provide a user device 140 with access to the document creation GUI supplied by document linking system 110. As will be further described with reference to FIG. 6, the document creation GUI may allow a user to create a new document and/or upload a document. The document creation GUI may also include optional parameters that the user may select. These parameters may indicate permissions for downstream users accessing the document. For example, the document owner may designate that the downstream recipient is to sign or acknowledge the document. In some embodiments, the parameters may designate the document as shareable and/or downloadable.

In some embodiments, the document provided by user device 140 may be a contract or an offer document used in a contractual negotiation process. Using the GUI provided by document linking system 110, a user may designate the contract as a document to be signed or acknowledged. In some embodiments, other documents may include to messages, attachments, clauses, online documents, smart documents, tokenized documents, contracts, smart contracts, tokenized contracts, agreements, records, files, books, archives, social media posts, news article, audio files, video files, website links, and/or other types of digital documents.

Upon receiving a document, document linking system 110 may generate a document link and/or token corresponding to the received document. As will be further explained below, document linking system 110 may store an encrypted version of the document and/or create a link to the encrypted version of the document. Document linking system 110 may also generate a cryptographic hash of the document. Using this information along with other information such as an owner identification and/or other metadata, document linking system 110 may create a document token corresponding to the document. The document token may represent ownership of the document and/or may be transmitted to a digital wallet corresponding to the document owner. Document linking system 110 may use the document token in future operations to determine access and/or modification permissions.

After generating the document token, document linking system 110 may provide the document token to the corresponding document delivery system 130 as link. In some embodiments, document linking system 110 may generate a link without using a document token. The link may be to an address of the database 120 storing the document. The link generated by document linking system 110 may be embedded into a message being drafted by a user device 140. A user device 140A may indicate to document delivery system 130A to transmit the message including the document link to an intended recipient. For example, this may be a user corresponding to user device 140B and using document delivery system 130B. In some embodiments, user device 140A may designate the recipient using an email address, social media identification, and/or other electronic identification of the intended user. Document delivery system 130A may then deliver the message to document delivery system 130B.

Upon receiving the message with the document link, user device 140B may access the document link. For example, document delivery system 130B may generate an Internet browser or application view allowing the user of user device 140B to select the document link. After selecting this link, user device 140B may connect to document linking system 110 to access the corresponding document. User device 140B may interact with the document based on the permissions set by user device 140A. These permissions may be associated with the document link. For example, the permissions may include viewing the document, acknowledging receipt of the document, signing the document, downloading the document as a file, sharing the document, and/or modifying the document. User device 140B may interact with the document according to this permission.

In some embodiments, to access the document, user device 140B may supply user credentials to document linking system 110. For example, if user device 140B has an account corresponding to document linking system 110, user device 140B may supply these credentials. In some embodiments, document delivery system 130B may supply the credentials on behalf of user device 140B. For example, document delivery system 130B may interact with document linking system 110 via a single sign-on process. In this manner, document linking system 110 may receive credentials corresponding to user device 140B attempting to access the document. As will be further explained below, this may also occur if another user device 140C also attempts to access the document link.

In some embodiments, document linking system 110 may record and/or log the access of the document link. Document linking system 110 may log this access in a document flow data structure. The document flow data structure may be stored in memory of document linking system 110. The document flow data structure may reflect a timeline of interactions with the document. The document flow data structure may track user credentials corresponding to an interaction, a timestamp, and/or a type of interaction. For example, if the user is asked to acknowledge or sign the document, the document flow data structure may track the user credentials and/or time that the document has been acknowledged and/or signed. As will be further described below, the document owner may manage the document flow data structure to track and/or manage access to the document as the document link is disseminated to additional user devices 140.

For example, the document owner may track and/or manage permissions if user device 140B forwards the document link to user device 140C. In this case, when user device 140C accesses the document link via document delivery system 130C, user device 140C and/or document delivery system 130C may also provide credentials to document linking system 110 to access and/or modify the document. Document linking system 110 may track and/or log the access in a similar manner. The document owner may use user device 140A to view the document flow data structure and view the access and/or modification performed by user device 140C. The document owner may further manage permissions specific to user device 140C. In some embodiments, even though user device 140A has not directly transmitted the document link to user device 140C, user device 140A may still view a record of the access and/or modification.

User device 140A may similarly manage permissions related to this access. These permissions may be managed using document linking system 110. In this manner, even if the document link is disseminated to different user devices 140, the permissions may still be controlled and/or altered without modifying the document link. Based on this modification, the document link may be disseminated and user device 140A may tailor permissions specific to recipients attempting to access the document. In this manner, user device 140A may be able to control and/or modify permissions corresponding to recipients that the user device 140A has not designated or may not be aware of when initially transmitting the document link.

Based on this configuration, document linking system 110 may provide a decentralized manner for disseminating documents while retaining control and/or permissions related to downstream users. Document linking system 110 may provide a decentralized file system for users of document delivery systems 130. By integrating a plugin or widget into these document delivery systems 130, user devices 140 may access document linking system 110 to disseminate documents via messages. Document linking system 110 may securely manage these documents and provide control over downstream access and/or modification of the documents.

In some embodiments, document linking system 110 may include object storage, a web service interface, storage for Internet applications, and/or cloud computing and/or storage. In some embodiments, document linking system 110 may use a peer-to-peer network and/or protocol for storing and/or sharing data in a distributed file system. For example, document linking system 110 may use content-addressing to uniquely identify files in a global namespace to network user devices 140. In some embodiments, document linking system 110 may use the InterPlanetary File System (IPFS) protocol and/or servers such as Amazon S3®.

Document linking system 110 may include an interface with database 120. Database 120 may be a private or public blockchain. Document linking system 110 may use one or more smart contract functions to interface and/or publish data to a blockchain. The smart contract functions may include protocols to digitally facilitate, verify, and/or enforce transactions. The transactions may be trackable and irreversible. As will be further described below, document linking system 110 may interface with database 120 to store data representing documents and/or modifications to documents. This data may include a cryptographic hash of a document and/or a link to a human-readable representation of the document.

In some embodiments, document linking system 110 may also manage processing tokens used to interact with database 120 and/or a blockchain. For example, document linking system 110 may manage digital wallet information related to cryptocurrencies. Document linking system 110 may use and/or consume digital currencies to execute transactions to a blockchain. For example, document linking system 110 may also manage gas, transaction, and/or mining fees used to conduct a transaction, execute a blockchain contract, and/or publish data onto a blockchain in a block. As will be further explained below, document linking system 110 may also manage document tokens which may represent ownership and/or permissions for documents and/or document modifications. Document linking system 110 may facilitate the publishing of document data to the blockchain and/or may remove processing tokens from an account corresponding to a digital wallet to perform the publishing.

To manage documents, document linking system 110 may publish the cryptographic hash of the document and/or the link to the encrypted version of the document using smart contract functions. The document may be encrypted using a key corresponding to the document owner. Publishing the document data onto the blockchain may preserve the trustworthiness of the document and the legitimacy of the document's content. For example, the immutable nature of a blockchain may protect against unauthorized document modifications or tampering. Further, the cryptographic hash may preserve privacy and may prevent other users of the blockchain from viewing confidential information.

In some embodiments, the document token may indicate that a recipient should acknowledge or sign a document. After accessing the link, document linking system 110 may identify an encrypted version of the document. The document linking system 110 may then decrypt the encrypted document using a digital signature key corresponding to the recipient. The recipient may provide a digital signature to confirm the acceptance. This digital signature may also be keyed to the recipient to provide verification and additional trustworthiness that the signature is legitimate and protected against interference or tampering. In some embodiments, the digital signature may also be reflected in the human-readable portion of the document.

In some embodiments, the digital signature may be a modification to the document. Document linking system 110 may manage this modification in a manner similar to generating a document so that the modified document may be preserved using database 120. For example, the signed document may be encrypted and stored as a modified version of the document. Document linking system 110 may generate a corresponding link to this encrypted version of the signed document and/or generate a cryptographic hash of the signed document. Document linking system 110 may create a document token corresponding to the signed document. Document linking system 110 may publish the hash and/or the link to the encrypted version of the signed document to a blockchain. Similarly, the encryption may have been performed using a key corresponding to the signing party to preserve confidentiality. In this manner, document linking system 110 may facilitate the acknowledgement or signing of a document or a contract using a document management process using a blockchain. In some embodiments, document linking system 110 may store and/or manage modifications using database 120.

Similar to the acknowledgment or signing of a document, document linking system 110 may manage document editing and/or modification. For example, user devices 140B and 140C may participate in editing the document. Document linking system 110 may use a tokenization process to manage different versions of the document corresponding to the different modifications.

Document linking system 110 may manage this modification in a manner similar to generating a document so that the modified document may be preserved using database 120 and/or a blockchain. The modified document may be encrypted and stored as a modified version of the document. Document linking system 110 may generate a corresponding link to this encrypted version of the modified document and/or generate a cryptographic hash of the modified document. In some embodiments, document linking system 110 may update an association corresponding to the document link to access the modified document. For example, a downstream user using the document link may be directed to the modified version of the document. The document flow data structure may also be updated to track the modification. The document owner may view this modification and/or accept or reject the modification. In some embodiments, downstream users may also be able to view the document flow data structure to track the changes. In some embodiments, document linking system 110 may create a separate document token and/or document link corresponding to the modified document. Document linking system 110 may publish the hash and/or the link to the encrypted version of the modified document to a blockchain.

Figure 1B:
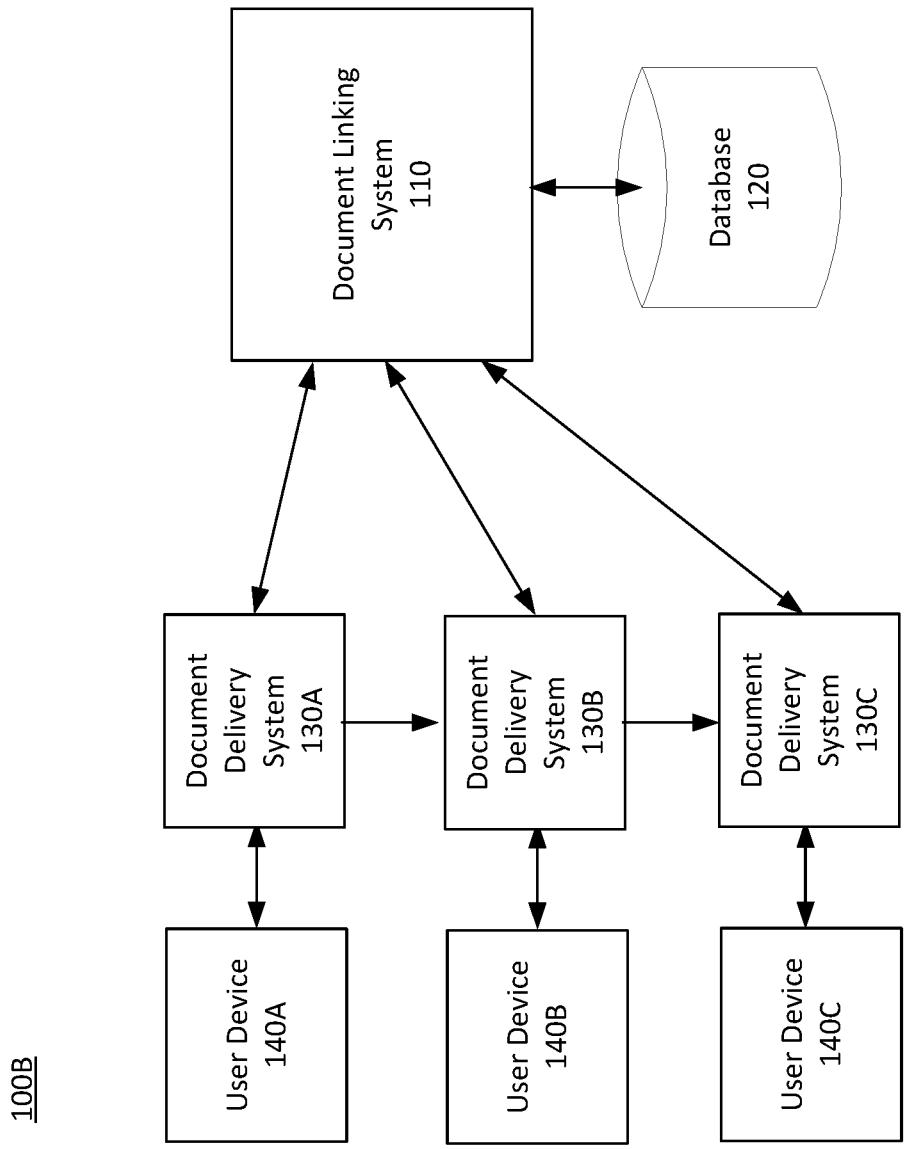
FIG. 1B depicts a block diagram of a document management environment with downstream dissemination, according to some embodiments.

FIG. 1B depicts a block diagram of a document management environment 100B with downstream dissemination, according to some embodiments. Similar to FIG. 1A, document management environment 100B may include document linking system 110, database 120, document delivery systems 130, and/or user devices 140. Document management environment 100B depicts an example embodiment of a data communication path corresponding to downstream dissemination.

In this case, user device 140A may seek to disseminate a document that may not be editable. User device 140A may use document delivery system 130A to deliver the document to user device 140B via document delivery system 130B. User device 140A may select a plugin or widget corresponding to document linking system 110 to generate a document token and/or document link corresponding to the document. User device 140A may designate the document as being public. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing and/or downloading based on the permissions set by user device 140A.

In some embodiments, user device 140B may forward the message to user device 140C via document delivery systems 130B, 130C. For example, user device 140B may forward the original message, may copy and paste the document link into a new message, and/or may switch between email and/or social media post to further disseminate the document link. User device 140C may receive the document link via document delivery system 130C. User device 140C may then access and/or download the document via the document link. Document linking system 110 may track credentials and/or access information corresponding to user device 140C. User device 140A may view this access information and/or modify permissions corresponding to user devices 140B and/or 140C. This permission control is further described with reference to FIG. 1D.

Figure 1C:
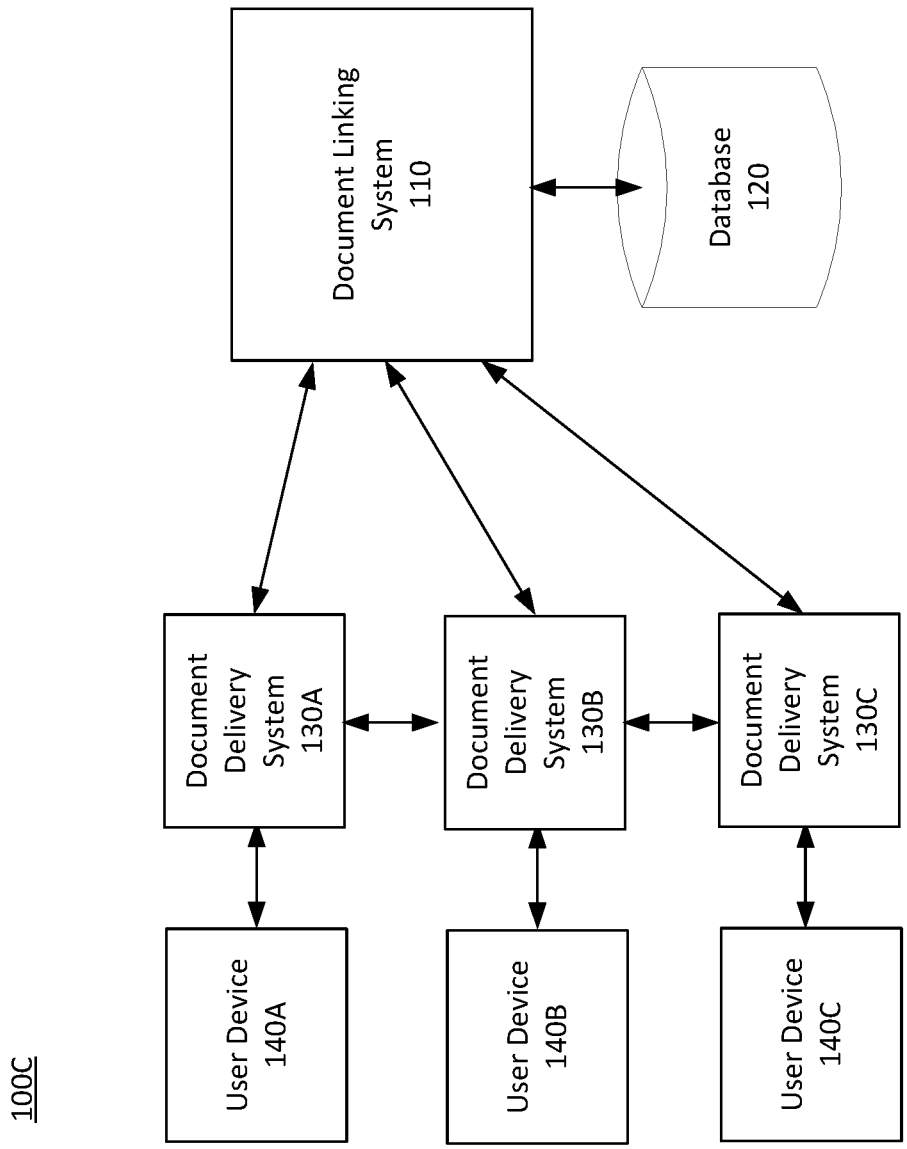
FIG. 1C depicts a block diagram of a document management environment with document collaboration, according to some embodiments.

FIG. 1C depicts a block diagram of a document management environment 100C with document collaboration, according to some embodiments. Similar to FIG. 1A, document management environment 100C may include document linking system 110, database 120, document delivery systems 130, and/or user devices 140. Document management environment 100C depicts an example embodiment of a data communication path corresponding to downstream dissemination with collaboration.

In this case, user device 140A may seek to disseminate a document that may be editable. User device 140A may use document delivery system 130A to deliver the document to user device 140B via document delivery system 130B. User device 140A may select a plugin or widget corresponding to document linking system 110 to generate a document token and/or document link corresponding to the document. User device 140A may designate the document as being editable. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing, downloading, and/or editing based on the permissions set by user device 140A.

In some embodiments, user device 140B may edit the document using document linking system 110. For example, document linking system 110 may generate a GUI with the document. User device 140B may edit and/or modify this document in this GUI. In some embodiments, an acknowledgment or a signature may be a modification. In some embodiments, user device 140B may modify other content in the document. After preserving this editing, document linking system 110 may generate a second document token corresponding to the modified document. This second document token may distinguish the modified document from the original document generated by user device 140A. In some embodiments, this second document token may represent a second version of the document. Upon generating the second document token, document linking system 110 may associate the second document token with the document link such that accessing the document link provides access to the second document token. In this manner, the document link may provide access to the modified document.

User device 140B may also modify the document by downloading the document, modifying the document locally, and uploading a modified version of the document. In this case, document linking system 110 may generate a second document token as described above and update the document link accordingly. Document linking system 110 may track the modification and upload of a new version.

As previously described, document linking system 110 may track edits, modifications, acknowledgments, and/or signatures using a document flow data structure. This document flow data structure may track one or more document tokens and corresponding versions. The modifications may be tracked with time stamps and/or identifying user information to identify users providing modifications. In this manner, a document owner may view modifications to the document as the document link is disseminated. The document owner may manage these modifications. For example, the document owner may accept or reject the modifications and/or associate different versions of the document with the document link. Actions taken by the document owner may be tracked in the document flow data structure. In some embodiments, downstream users may be able to view the document flow data structure. This may depend on whether the document owner has chosen to provide this access to downstream users. Using the document flow data structure, document linking system 110 may track modifications and/or track access as the document is modified.

In some embodiments, user device 140B may provide the document link to user device 140C. For example, user device 140B may be collaborating with user device 140C to modify the document. User devices 140B, 140C may perform one or more iterations of the document to modify the document. Despite the modifications, user devices 140B, 140C may use the same document link. Document linking system 110 may track the modifications as well as user credentials corresponding to the modifications. In some embodiments, document linking system 110 may store modified versions of the document on database 120.

User device 140A corresponding to the document owner may view the document flow data structure to monitor the modifications. In some embodiments, user device 140A may accept or reject modifications entered by user devices 140B, 140C. As will be further described with reference to FIG. 1D, user device 140A may also restrict access to the document to one or more downstream users. In this case, document linking system 110 may update the document flow data structure with this restriction.

Figure 1D:
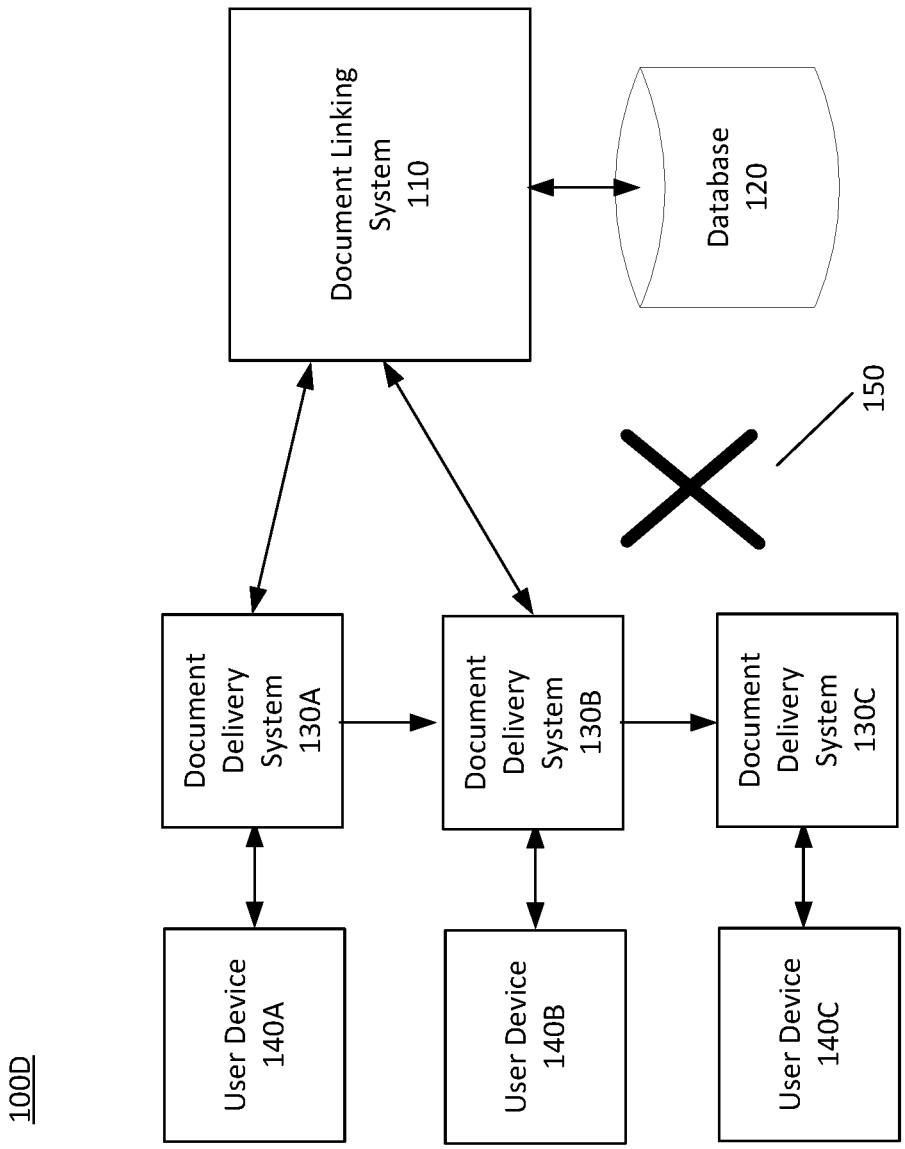
FIG. 1D depicts a block diagram of a document management environment with permission control, according to some embodiments.

FIG. 1D depicts a block diagram of a document management environment 100D with permission control, according to some embodiments. Similar to FIG. 1A, document management environment 100D may include document linking system 110, database 120, document delivery systems 130, and/or user devices 140. Document management environment 100D depicts an example embodiment of a data communication path corresponding to downstream dissemination with a restriction 150.

In this case, user device 140A may seek to disseminate a document that may or may not be editable. User device 140A may use document delivery system 130A to deliver the document to user device 140B via document delivery system 130B. User device 140A may select a plugin or widget corresponding to document linking system 110 to generate a document token and/or document link corresponding to the document. Document linking system 110 may transmit the document link to document delivery system 130A. Document delivery system 130A may then embed the document link in the message being drafted by user device 140A. User device 140A may then send the message to user device 140B via document delivery systems 130A, 130B.

User device 140B may then access the document link in the manner described above. Document linking system 110 may log and/or track this access. Document linking system 110 may provide the document for viewing, downloading, and/or editing based on the permissions set by user device 140A.

User device 140B may forward the message to user device 140C via document delivery systems 130B, 130C. For example, user device 140B may forward the original message, may copy and paste the document link into a new message, and/or may switch between email and/or social media post to further disseminate the document link. User device 140C may receive the document link via document delivery system 130C. User device 140C may then access and/or download the document via the document link. Document linking system 110 may track credentials and/or access information corresponding to user device 140C.

User device 140A may view this access information and/or modify permissions corresponding to user devices 140B and/or 140C. For example, user device 140A may determine that the user corresponding to user device 140C should no longer be able to view and/or download the document. User device 140A may send a command to document linking system 110 to alter this access. Document linking system 110 may associate this permission with the credentials provided by user device 140C. Document linking system 110 may generate a restriction 150 based on these credentials. For example, the credentials may correspond to the single sign on credentials provided by document delivery system 130C. In this manner, restriction 150 may be conditioned on the credentials corresponding to document delivery system 130C. While restriction 150 is depicted with respect to user device 140C, user device 140A may restrict permissions corresponding to user device 140B.

In some embodiments, restriction 150 may be applied to a document and/or to individual users attempting to access the document. For example, a document owner may apply restriction 150 to each user attempting to access the document via the document link. This may occur to restrict access to the document from each user. In some embodiments, the document owner may restrict access after determining that a particular user has accessed the document. For example, after viewing the document flow data structure, the document owner may determine that a particular use who has accessed the document should not have access. This may be noted based on the logging performed by the document flow data structure. After determining that a particular user should not have access, document linking system 110 may apply restriction 150 to that user. This may be applied to the credentials used by the user to access document linking system 110 and/or a corresponding document delivery system 130.

Restriction 150 may be applied to different permissions. For example, rather than preventing viewing of the document, a document owner may change download and/or editing permissions for a particular user. This control may provide additional flexibility for controlling access as a document is disseminated.

Based on the restrictions 150 applied by document linking system 110, document linking system 110 may provide downstream control related to access of a document. This control may occur even a document link is disseminated beyond an initial one or more recipients. A document owner may tailor restrictions and/or permissions to additional individuals accessing the document as the document is disseminated. In some embodiments, the document link may specify a default permission, such as public, semi-public, or confidential as previously explained. Document linking system 110 may then adjust different permissions for different users even after the document link has been disseminated.

Other functions and/or operations of document linking system 110 will now be further described with reference to the other figures of this disclosure.

Figure 2:
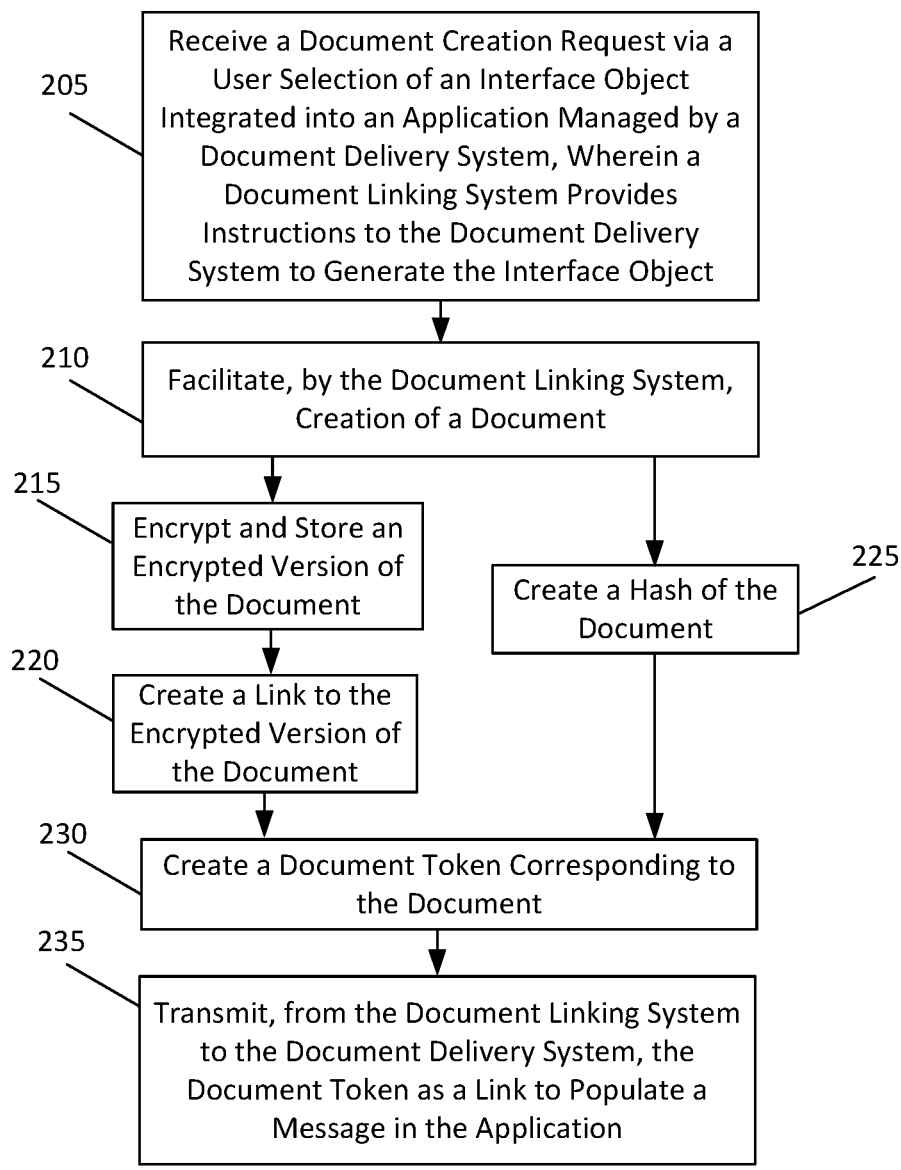
FIG. 2 depicts a flowchart illustrating a method for generating a document token, according to some embodiments.

FIG. 2 depicts a flowchart illustrating a method 200 for generating a document token, according to some embodiments. Method 200 shall be described with reference to FIG. 1A; however, method 200 is not limited to that example embodiment.

In an embodiment, document linking system 110 may facilitate the generation of a document, document token, and/or a document link. While method 200 is described with reference to document linking system 110, method 200 may be executed on any computing device, such as, for example, the computer system described with reference to FIG. 16 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

At 205, document linking system 110 may receive a document creation request via a user selection of an interface object integrated into an application managed by a document delivery system 130. The document linking system 110 may have provided instructions to the document delivery system 130 to generate the interface object. As explained with reference to FIG. 1A, the interface object may be a plugin or widget. A document delivery system 130 may receive configurable coded instructions, executable instructions, programming, and/or other software to implement the interface object. The interface object may be implemented into a messaging webpage and/or application. A user device 140 accessing document delivery system 130 may select the interface object to generate a document creation request. As will be further explained below, document linking system 110 may provide a graphical user interface (GUI) to be displayed on user device 140. User device 140 may interact with the GUI via API interactions. In some embodiments, document linking system 110 may manage user accounts and/or user profiles. A user may log-in to the document linking system 110 to generate a document creation request. In some embodiments, user credentials may be provided to document linking system 110 by document delivery system 130.

As previously explained, the document creation request may be initiated from an interaction with a web widget on a web page. For example, a website managed by document delivery system 130 may include a widget that may trigger document linking system 110 to facilitate the creation of a document. The website may be managed by a third-party system and/or administrator while document linking system 110 may facilitate document creation in response to a user interacting with the widget. The widget may be a plug-in for the website. In some embodiments, the widget may be implemented in a web application, messaging application, and/or a mobile application.

At 210, document linking system 110 may facilitate the creation of a document. In some embodiments, document linking system 110 may receive an upload of a document from a user device 140. After receiving credentials from user device 140 and/or document delivery system 130, document linking system 110 may generate a GUI allowing user device 140 to upload a document file. As further explained below, document linking system 110 may generate a document token and/or a document link based on the document.

In some embodiments, document linking system 110 may generate a GUI element to be displayed on user device 140 to allow a user to generate a document. For example, the GUI element may be a fillable form allowing a user to input textual inputs. In some embodiments, the fillable form may include fields indicating requested textual data. A user may input textual data to designate the content of the document. The GUI element may be a pop-up template or form on a web page currently being viewed on the user device 140. The GUI element may allow the user to draft a document. While the user may generate a document via typewritten text and/or a fillable form, the creation of the document may also allow the user to attach additional documents. For example, the user may include links to documents stored in a cloud storage system to be included in the generated document.

At 215, document linking system 110 may encrypt and/or store an encrypted version of the document. For example, document linking system 110 may encrypt the document using a digital key corresponding to the user generating the document and/or the user intended to receive the document. Document linking system 110 may facilitate the distribution of keys to the recipient of the document. Document linking system 110 may use this key to encrypt the document generated by the document owner. In some embodiments, the document owner may provide a cryptographic key, and document linking system 110 may use the document owner's key to encrypt the document. Document linking system 110 may then provide this key to the recipient for decrypting the document.

In some embodiments, document linking system 110 may store an encrypted version of the document in a database. The database may be web-accessible and may be accessed using a link generated at 220. At 220, document linking system 110 may create a link to the encrypted version of the document. The link may be a document link. This document link may be embedded and/or shared. The document link may be a uniform resource locator (URL) or other web address identifying the storage location of the encrypted document. Because the stored document is encrypted, discovery of the link may still maintain confidentiality due to the encrypted nature of the document. In some embodiments, user credentials provided to document linking system 110 may provide access to the decrypted version of the document.

At 225, document linking system 110 may generate a hash of the document. The hash may be a cryptographic hash of the document. This cryptographic hash may be a one-way hash function and/or may be used on a database 120 and/or blockchain to provide block verification. This may provide a decentralized configuration for a blockchain using a proof of work algorithm or other types of blockchain proof algorithms or methodologies. The hash may further provide proof that a document has not experienced tampering and is a true representation of the document.

At 230, document linking system 110 may create a document token corresponding to the document. The document token may represent ownership of the document. A document token may be a type of digital token, crypto token, or virtual currency that may be used with digital wallets to designate ownership. A document token, however, may differ from a cryptocurrency as document tokens may be non-fungible and instead may be unique to each created document. In some embodiments, the permissions may correspond to a secrecy designation related to the document as previously described. The secrecy designation may be metadata corresponding to the document token. In some embodiments, document linking system 110 may publish the hash of the document and/or the link to the encrypted version of the document to a blockchain using one or more smart contract functions. Publishing the hash of the document and/or the link to the encrypted version of the document may preserve the document and indicate a version of the document that may be trusted as free from tampering. The publication of these elements may further preserve a party's contractual position.

At 235, document linking system 110 may transmit the document token to the document delivery system 130 as a link to populate a message in the messaging application. As previously explained, a user may be generating a message and may wish to disseminate a document using the message application corresponding to a document delivery system 130. Document linking system 110 may embed a document link in this message for dissemination. In some embodiments, rather than transmitting the document token as a link, document linking system 110 may transmit the link generated in 220 to the document delivery system 130.

Figure 3A:
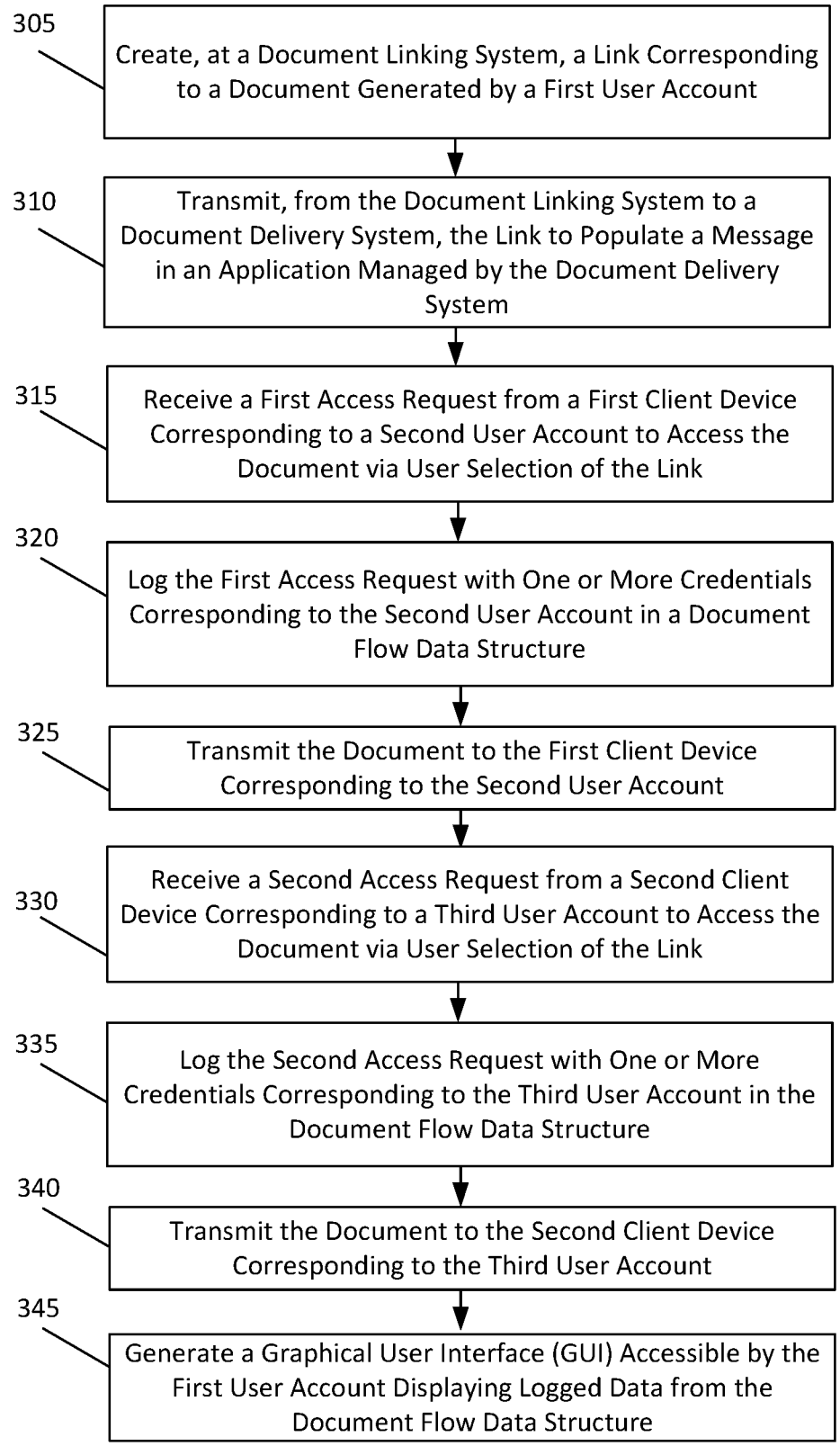
FIG. 3A depicts a flowchart illustrating a method for tracking document access via a document token, according to some embodiments.

FIG. 3A depicts a flowchart illustrating a method 300A for tracking document access via a document token, according to some embodiments. Method 300A shall be described with reference to FIG. 1A; however, method 300A is not limited to that example embodiment.

In an embodiment, document linking system 110 may track downstream access via a document link. This access may correspond to accessing, viewing, downloading, sharing, acknowledging, signing, editing, and/or modifying the document. While method 300A is described with reference to document linking system 110, method 300A may be executed on any computing device, such as, for example, the computer system described with reference to FIG. 16 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3A, as will be understood by a person of ordinary skill in the art.

At 305, document linking system 110 may create a link corresponding to a document generated by a first user account. For example, the first user account may correspond to user device 140A. Document linking system 110 may generate a document link in a manner similar to that described with reference to FIGS. 1A and 2. At 310, document linking system 110 may transmit the link to a document delivery system 130A to populate a message in the messaging application. In some embodiments, this may be a document token link. This may occur in a manner similar to that described with reference to FIGS. 1A and 2.

At 315, document linking system 110 may receive a first access request from a first client device corresponding to a second user account to access the document via user selection of the link. In this case, the first client device may correspond to user device 140B. The user selection may be a selection of the link within a message received from user device 140A and/or document delivery system 130A. Upon accessing the link, document linking system 110 may request log-in credentials for the user. These log-in credentials may correspond to document linking system 110. In some embodiments, the log-in credentials may correspond to document delivery system 130B servicing user device 140B. In this manner, if document delivery system 130B interfaces with document linking system 110, document delivery system 130B may provide a single sign on process for user device 140B.

At 320, document linking system 110 may log the first access request with one or more credentials corresponding to the second user account in a document flow data structure. As described with reference to FIG. 1A, the first access request may correspond to a permission set by document linking system 110. For example, if the permission may be set for access requests to correspond to viewing the document, document linking system 110 may identify the access request as a viewing performed by user device 140B. As previously explained, document linking system 110 may log this viewing in a document flow data structure with credentials corresponding to the user and/or a time stamp corresponding to the interaction. In some embodiments, the access request may correspond to accessing, viewing, downloading, sharing, acknowledging, signing, editing, and/or modifying the document. In this case, document linking system 110 may log this interaction for the document. The document flow data structure may also track document participants and/or events such as creation, viewing, signing, sharing or downloading. The document flow data structure may also track times, dates, and/or locations like the latitude and longitude of digitally transmitted information. For example, the document flow data structure may track global positioning coordinates related to the first access request.

At 325, document linking system 110 may transmit the document to the first client device corresponding to the second user account. Document linking system 110 may transmit the document according to the permissions set by the first user account. The second user account may interact with the document according to the permission. The second user account may also further disseminate the document link to other client devices. In this case, document linking system 110 may receive a request to access the document from other client devices.

At 330, document linking system 110 may receive a second access request from a second client device corresponding to a third user account to access the document via user selection of the link. The second client device may correspond to user device 140C. As previously explained, this may occur in the situation where user device 140B forwards the document link to user device 140C. This may occur with or without the knowledge of the document owner. User device 140C may then attempt to access the document using the link.

At 335, document linking system 110 may log the second access request with one or more credentials corresponding to the third user account in the document flow data structure. This logging may occur in a manner similar to 320. Document linking system 110 may track access from the second client device. At 340, document linking system 110 may transmit the document to the second client device corresponding to the third user account. This may occur in a manner similar to 325. Access to the document may be controlled based on the permissions set by the document owner and/or determined by document linking system 110. The third user account may interact with the document based on this permission.

Figure 3B:
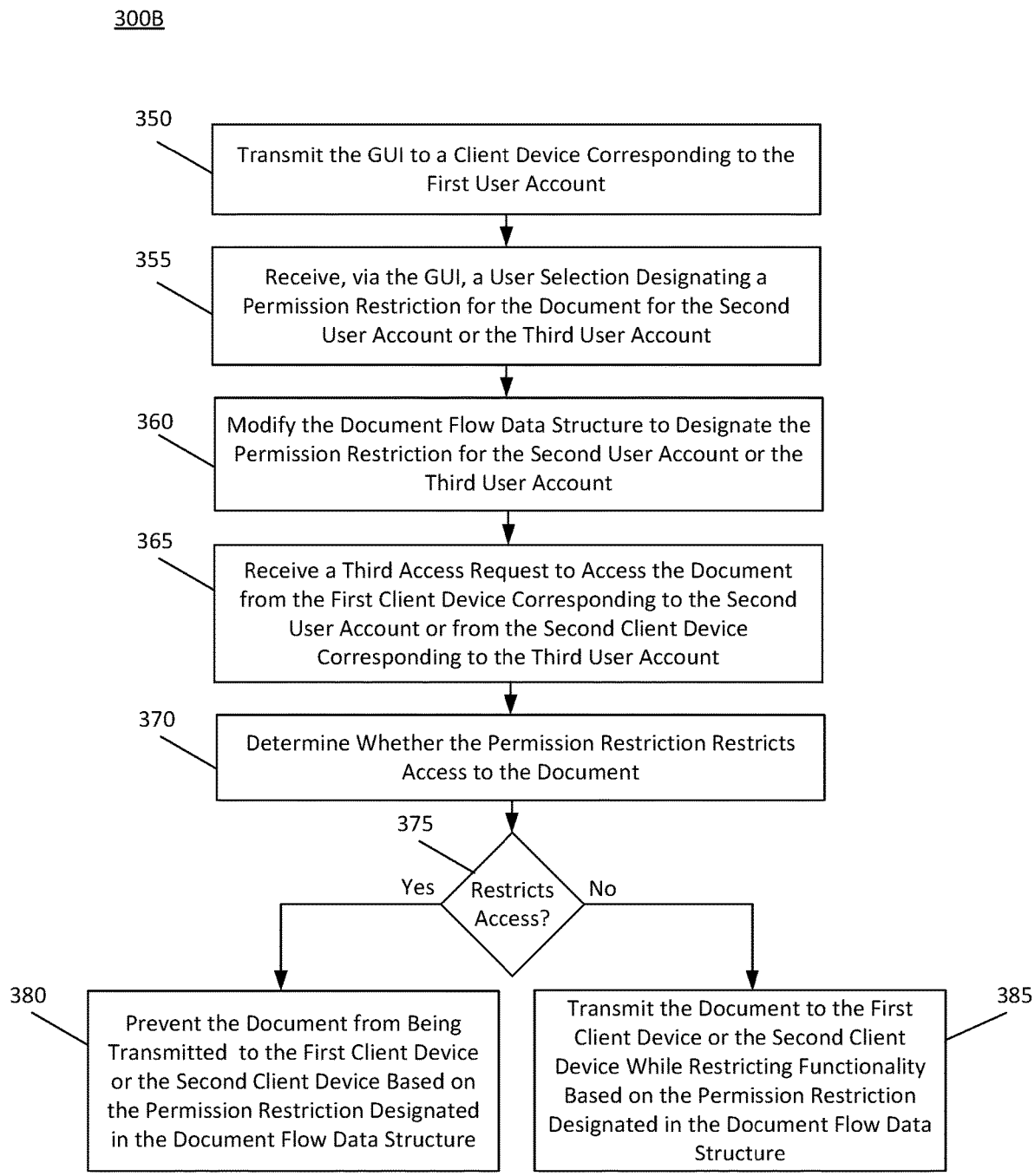
FIG. 3B depicts a flowchart illustrating a method for managing document permissions, according to some embodiments.

At 345, document linking system 110 may generate a graphical user interface (GUI) accessible by the first user account displaying logged data from the document flow data structure. For example, using user device 140A, the first user account or document owner may view the GUI. An example of this GUI is described with reference to FIG. 10. Using the GUI, the first user account may set permissions corresponding to document access. As previously explained, these permissions may correspond to the document and/or may be individualized corresponding to each user account. Using this GUI, a document owner may track interactions with the document. These interactions may be different and/or may be timestamped to reflect the interaction. In some embodiments, global positioning locations may also be tracked with these interactions FIG. 3B depicts a flowchart illustrating a method 300B for managing document permissions, according to some embodiments. Method 300B shall be described with reference to FIG. 1A; however, method 300B is not limited to that example embodiment.

In an embodiment, document linking system 110 may execute method 300B after method 300A. Using method 300B, a document owner may modify downstream permissions. This modification may occur even after a document link has been disseminated. Method 300B described with reference to FIG. 16 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3B, as will be understood by a person of ordinary skill in the art.

At 350, document linking system 110 may transmit the GUI to a client device corresponding to the first user account. As described with reference to 345, the client device may be user device 140A and/or may correspond to the document owner. The user corresponding to the first user account may view the document flow data structure data indicating interactions with the document.

At 355, document linking system 110 may receive, via the GUI, a user selection designating a permission restriction for the document for the second user account or the third user account. The document owner may specify a restriction corresponding to one or more downstream users. This restriction may remove and/or alter previously granted permissions. For example, a user that was previously allowed to modify the document may be disallowed. In some embodiments, 355 may also be used to grant permissions and/or remove restrictions. At 360, document linking system 110 may modify the document flow data structure to designate the permission restriction for the second user account or the third user account. Updating the document flow data structure may include storing the updated permissions or restrictions with a timestamp. In some embodiments, the restrictions and/or permissions may be associated with the user credentials supplied by user devices 140B, 140C and/or document delivery systems 130B, 130C.

At 365, document linking system 110 may receive a third access request to access the document from the first client device corresponding to the second user account or from the second client device corresponding to the third user account. This third access request may occur after the change in permissions and/or restrictions. In this case, the client devices may attempt to use the document link to access the document. In some embodiments, the client devices may attempt to access the document via document delivery systems 130B, 130C.

At 370, document linking system 110 may determine whether the permission restriction restricts access to the document. In some embodiments, document linking system 110 may compare credentials provided by the client devices to the credentials stored in the document flow data structure. If a restriction matches the credentials, the access to the document may be restricted. As previously described, this restriction may prevent viewing the document. In some embodiments, the restrictions may be for different functions such as modifying the document. In this case, a user may be allowed to view the document but not allowed to commit modifications to the document. At 375, document linking system 110 may determine whether to restrict access to the document based on the user credentials.

At 380, if the restriction prevents access to the document, document linking system 110 may prevent the document from being transmitted to the first client device or the second client device based on the permission restriction designated in the document flow data structure. In some embodiments, this restriction may prevent a particular user from viewing the document. As previously explained, this restriction may be associated with user credentials and may prevent access based on received user credentials. In some embodiments, the restriction may be a change to the default permission for the document.

At 385, if the restriction does not prevent access to the document, document linking system 110 may transmit the document to the first client device or the second client device while restricting functionality based on the permission restriction designated in the document flow data structure. In this case, the restriction may still permit viewing the document but may restrict and/or prevent other interactions. For example, users may not be able to edit or modify the document.

Using methods 300A and/or 300B, a document owner may be able to view, manager, and/or control downstream dissemination of documents. A document owner may be able to view interactions with the document via the document flow data structure. The document owner may also be able to specify restrictions tailored to individuals attempting to access the document. This may occur even if the document owner is unaware of the users who receive document links. While the foregoing description has focused on restricting permissions, the document owner may also grant permissions in a similar manner.

Figure 4:
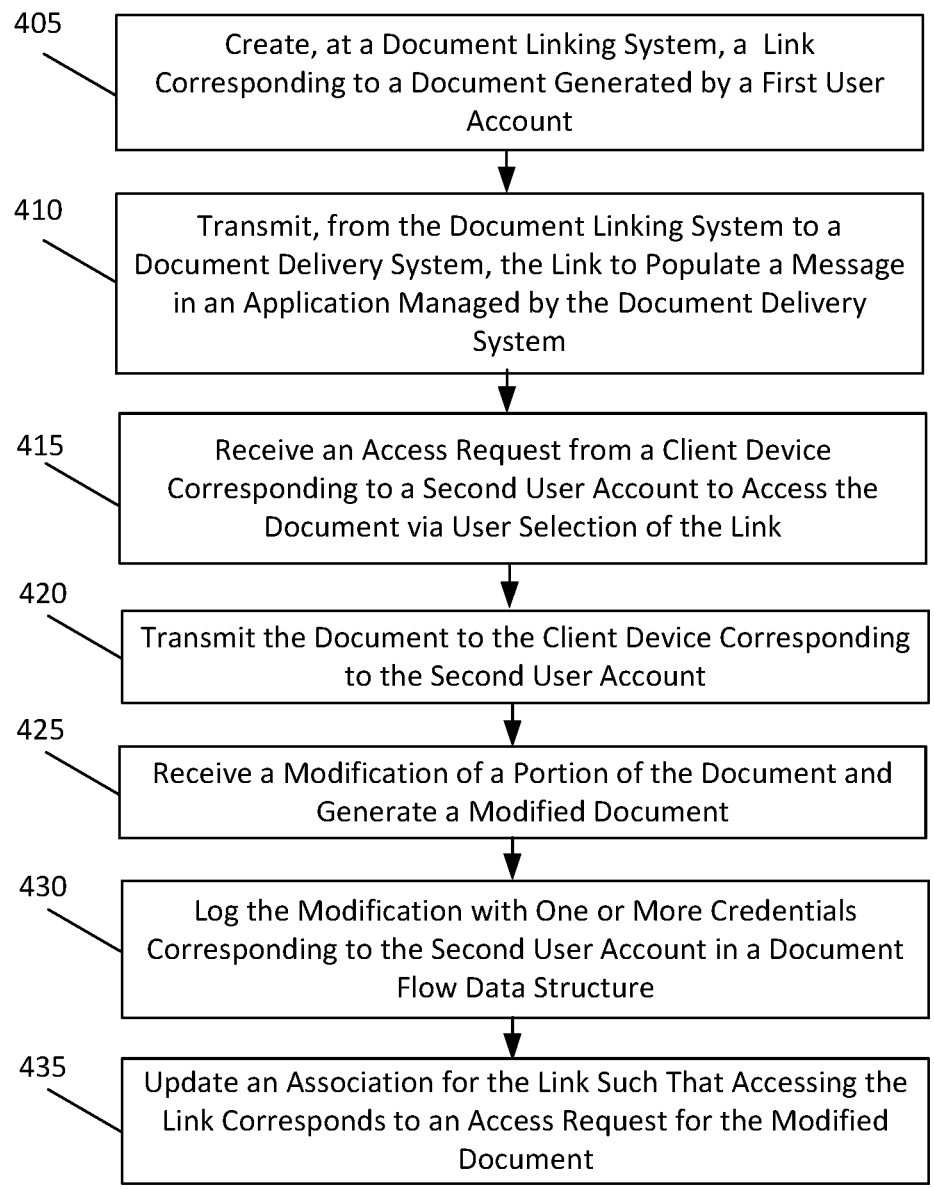
FIG. 4 depicts a flowchart illustrating a method for modifying a document, according to some embodiments.

FIG. 4 depicts a flowchart illustrating a method 400 for modifying a document, according to some embodiments. Method 400 shall be described with reference to FIG. 1A; however, method 400 is not limited to that example embodiment.

In an embodiment, document linking system 110 may facilitate the modification of a document. This modification may be permitted depending on the permissions corresponding to a document token. While method 400 is described with reference to document linking system 110, method 400 may be executed on any computing device, such as, for example, the computer system described with reference to FIG. 16 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, document linking system 110 may create a link corresponding to a document generated by a first user account. For example, the first user account may correspond to user device 140A. Document linking system 110 may generate a document link and/or document token in a manner similar to that described with reference to FIGS. 1A and 2. At 410, document linking system 110 may transmit the document link and/or the first document token as a link to a document delivery system 130A to populate a message in the messaging application. This may occur in a manner similar to that described with reference to FIGS. 1A and 2.

At 415, document linking system 110 may receive an access request from a client device corresponding to a second user account to access the document via user selection of the link. In this case, the client device may correspond to user device 140B. The user selection may be a selection of the link within a message received from user device 140A and/or document delivery system 130A. Upon accessing the link, document linking system 110 may request log-in credentials for the user. These log-in credentials may correspond to document linking system 110. In some embodiments, the log-in credentials may correspond to document delivery system 130B servicing user device 140B. In this manner, if document delivery system 130B interfaces with document linking system 110, document delivery system 130B may provide a single sign on process for user device 140B.

At 420, document linking system 110 may transmit the document to the client device corresponding to the second user account. Document linking system 110 may transmit the document according to the permissions set by the first user account. The second user account may interact with the document according to the permission. In some embodiments, the second user account may be permitted to modify the document.

At 425, document linking system 110 may receive a modification of a portion of the document and generate a modified document. In some embodiments, this modification may be the upload of a modified version of the document. In some embodiments, a user may modify the document using a GUI displayed on user device 140B. The GUI may be provided by document linking system 110. Document linking system 110 may capture and/or save the modification. In some embodiments, the modification may be an acknowledgment and/or a signature corresponding to the document.

At 430, document linking system 110 may log the modification with one or more credentials corresponding to the second user account in a document flow data structure. As previously described, this logging may also preserve a time stamp corresponding to the second user account. Logging the modification in the document flow data structure may associate the modification with the second user account. The document owner may view the document flow data structure to track modifications to the document.

In some embodiments, document linking system 110 may create a second document token corresponding to the modified document. Document linking system 110 may preserve the first document token as the original document while saving the modified version of the document as a second document token. In some embodiments, document linking system 110 may preserve the document tokens on database 120 and/or a blockchain. Because of the immutability of a blockchain, subsequent modifications may be preserved. In some embodiments, modifications may be preserved in database 120 without using document tokens.

At 435, document linking system 110 may update an association for the link such that accessing the link corresponds to an access request for the modified document. For example, document linking system 110 may modify a database 120 entry to associate the modified document with the link. In this case, a document link may be shared between different users collaborating and/or modifying a document. Document linking system 110 may provide the modified documents to each user to view the collaboration. In some embodiments, document linking system 110 may track the modifications using a document flow data structure to track the modifications. In some embodiments, a document owner and/or other users may view modified and/or unmodified document when accessing the link. In some embodiments, a document owner may accept or reject a modified version of the document. In this case, the link may be updated to reflect a version of the document that has been accepted.

Figure 5A:
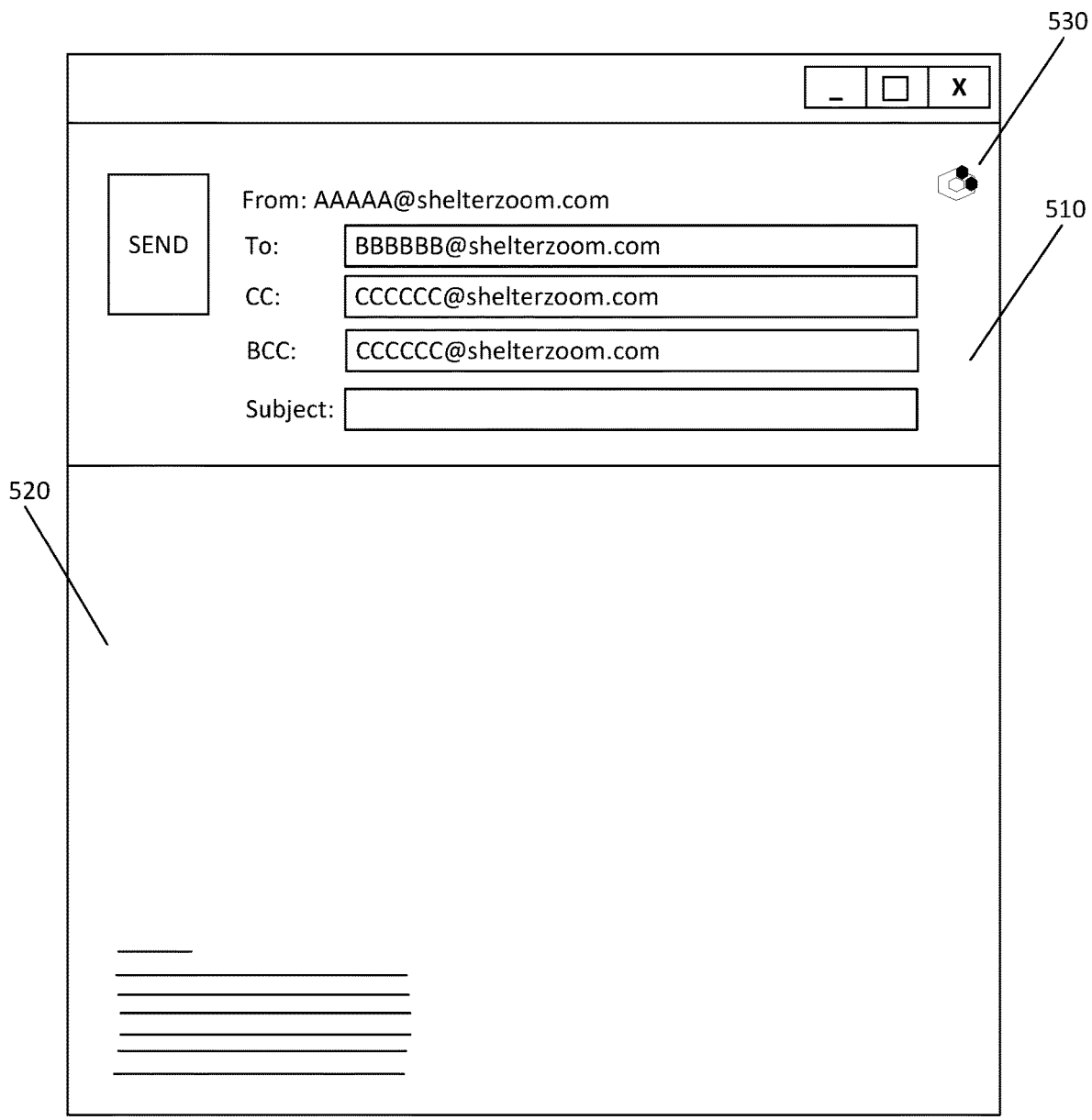
FIG. 5A depicts a block diagram of a graphical user interface including a document token generation plugin, according to some embodiments.

FIG. 5A depicts a block diagram of a graphical user interface (GUI) 500A including a document token generation plugin, according to some embodiments. GUI 500A may be generated by a document delivery system 130 and/or may be displayed on a user device 140. Document delivery system 130 may present GUI 500A for a user to draft a message to send to one or more intended recipients. GUI 500A may include a recipient portion 510 and/or a message portion 520. The recipient portion 510 may be used to designate recipient information and/or subject information for a message. Message portion 520 may include the body of the message and/or may include a document link as provided by document linking system 110. Document linking system 110 may generate the document link to be inserted into the message by document delivery system 130. This may be inserted in message portion 520.

To generate the document link, a user may select link icon 530. Link icon 530 may be a GUI element integrated into GUI 500A. Link icon 530 may correspond to a widget or plugin provided by document linking system 110. Document delivery system 130 may receive configurable coded instructions, programming, and/or software to generate link icon 530. When a user selects link icon 530, document delivery system 130 may interface with document linking system 110 via an application programming interface (API). Via the API, document linking system 110 may provide a GUI for accepting a document. This GUI is further described with reference to FIG. 6. After receiving the document, document linking system 110 may generate a document link to be inserted into the message managed by document delivery system 130.

Figure 5B:
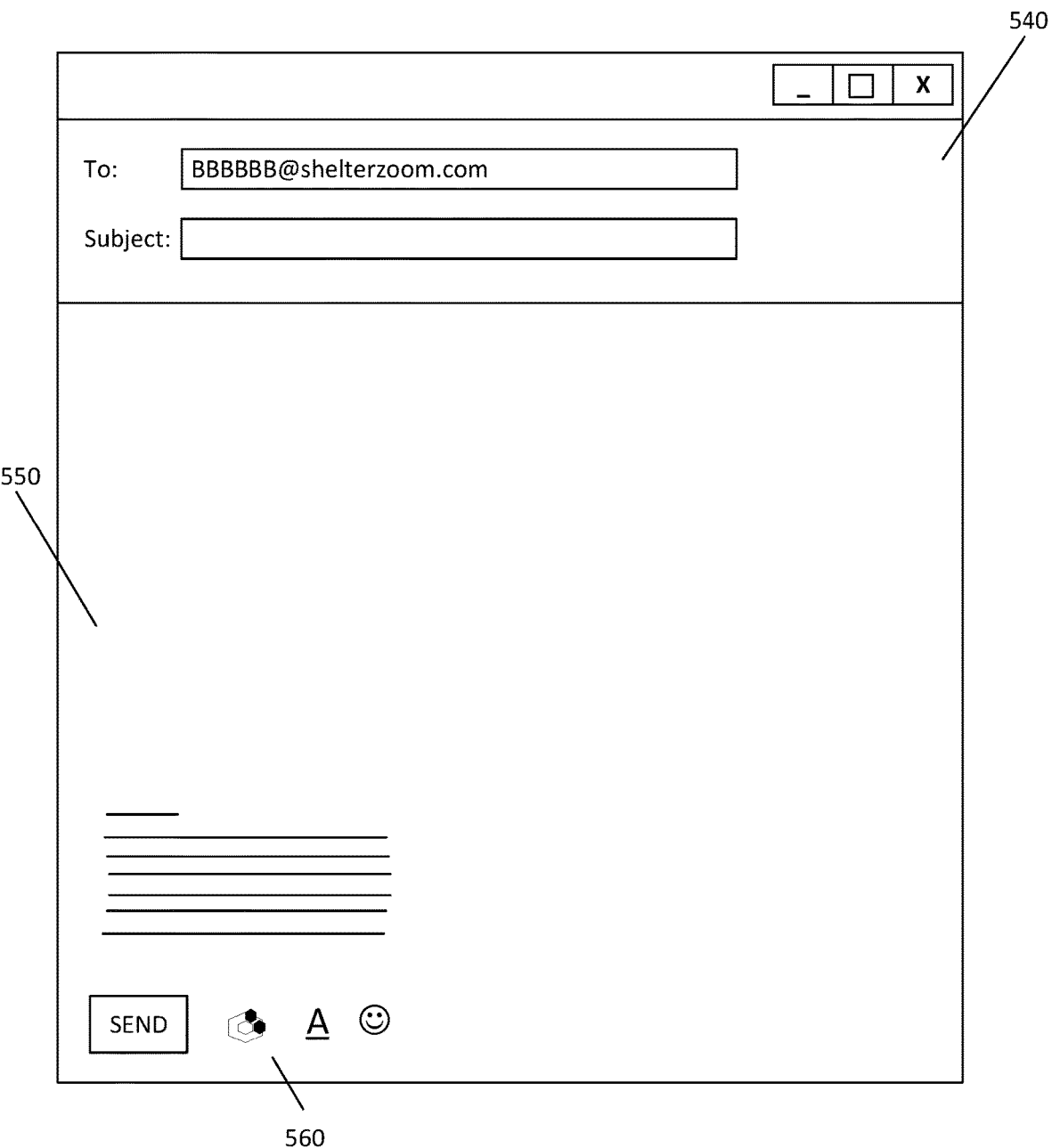
FIG. 5B depicts a block diagram of a graphical user interface including a document token generation plugin in a toolbar, according to some embodiments.

FIG. 5B depicts a block diagram of a graphical user interface (GUI) 500B including a document token generation plugin in a toolbar, according to some embodiments. Similar to GUI 500A, GUI 500B may be provided by a document delivery system 130. For example, GUI 500A may correspond to document delivery system 130A while GUI 500B may correspond to document delivery system 130B. GUI 500B may include a recipient portion 540 similar to recipient portion 510. GUI 500B may also include message portion 550 similar to message portion 520. GUI 500B may also include link icon 560 similar to link icon 530. Link icon 560 may be included in a toolbar. Document delivery system 130 may integrate link icon 560 into this toolbar with other icons usable by the user to generate the message. Accessing link icon 560 may provide access to document linking system 110 in a manner similar to GUI 500A.

GUIs 500A and 500B may demonstrate that the plugin or widget provided by document linking system 110 may be integrated into different types of document delivery systems 130. These different document delivery system 130 may generate corresponding link icons 530, 560 in different manners as well. Document linking system 110 may still provide the document link functionality regardless of the type of document delivery system 130. For example, this link may be implemented into a web page, web application, cloud application, mobile application, and/or other platform managed by a document delivery system 130.

Figure 6:
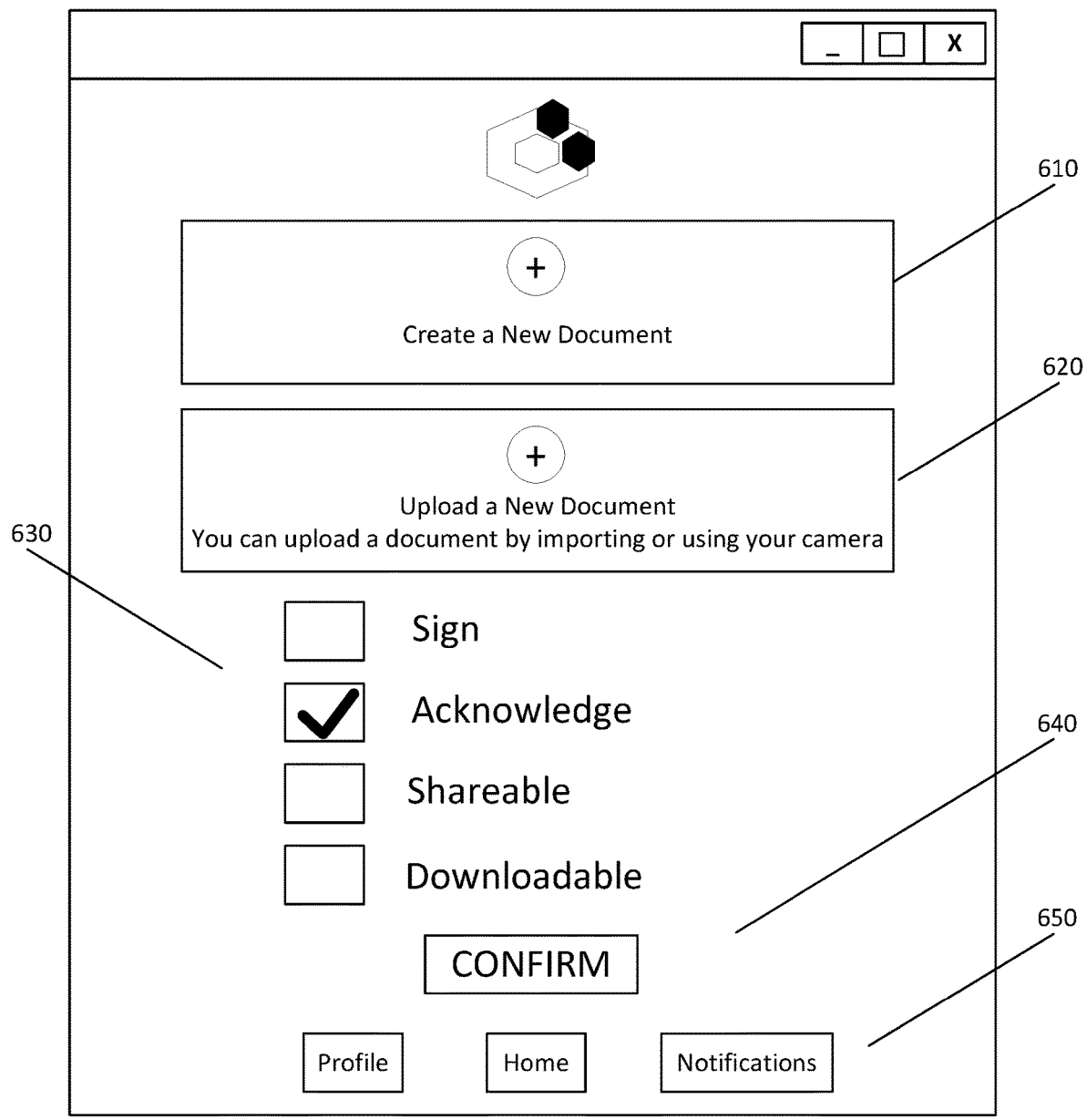
FIG. 6 depicts a block diagram of a graphical user interface for creating a document token, according to some embodiments.

FIG. 6 depicts a block diagram of a graphical user interface (GUI) 600 for creating a document token, according to some embodiments. GUI 600 may be provided to a user device 140 from document linking system 110. User device 140 may interact with GUI 600 for providing a document to document linking system 110. GUI 600 may include a document creation icon 610, a document upload icon 620, a permission designation 630, a confirmation icon 640, and/or a menu bar 650.

In some embodiments, GUI 600 may include one or both of a document creation icon 610 and a document upload icon 620. A user may use icons 610, 620 to provide a document to document linking system 110. As previously described, using document creation icon 610 may allow a user to draft a document via document linking system 110. Using document upload icon 620 may allow a user to upload a document to document linking system 110. Using permission designation 630, the user may also designate a permission corresponding to the document. In some embodiments, this may be a default permission for the document. In some embodiments, the permissions may indicate that the document is to be signed, acknowledged, shareable, and/or downloadable. Permission designation 630 may also include other permissions such as whether the document may be modified. After supply the document, the user may select confirmation icon 640 to confirm the generation of the document link.

Included in GUI 600 may also be a menu bar 650. The menu bar 650 may be provided by document linking system 110 to navigate different document aspects. For example, the user may select a profile button to view user account information corresponding to the user. Similarly, the user may select a home button to return to a home screen to view one or more documents corresponding to the user. These documents may be documents created and/or accessed by the users. Menu bar 650 may also include a notifications button to identify notifications related to one or more documents. These notifications may include, for example, updates to document flow data structures corresponding to the documents. For example, if a user has signed or acknowledged a document associated with the user account, document linking system 110 may generate a notification for the document owner and/or other users associated with the document.

Figure 7:
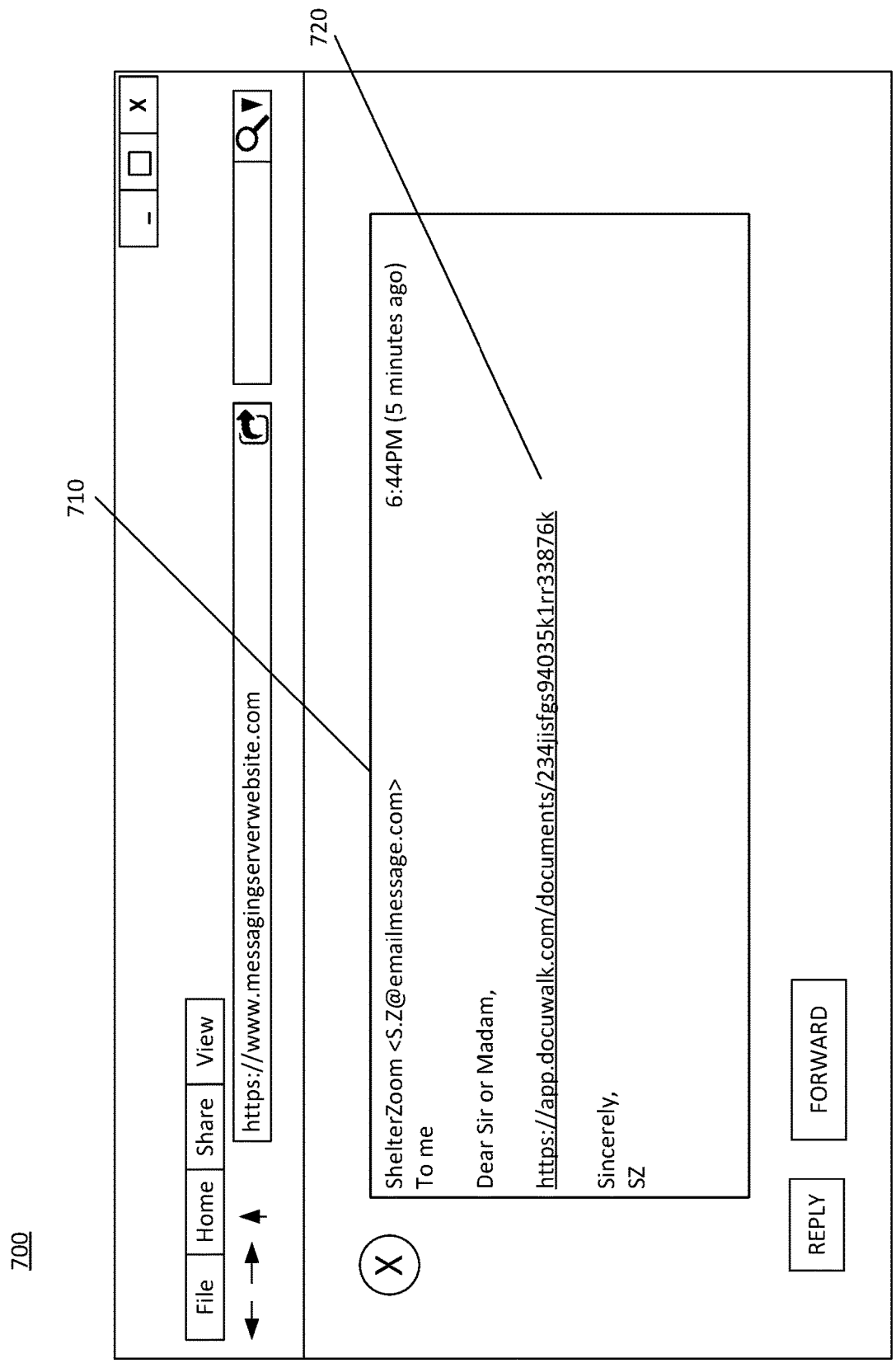
FIG. 7 depicts a block diagram of a graphical user interface displaying a message including a document link, according to some embodiments.

FIG. 7 depicts a block diagram of a graphical user interface (GUI) 700 displaying a message 710 including a document link 720, according to some embodiments. A user may receive message 710, which may include document link 720. As previously explained, document link 720 may have been inserted into the message 710 prior to sending the message to an intended recipient. The sender of message 710 may include other information in the body of the message as well. Upon receiving message 710, the recipient may select document link 720 to access document linking system 110 and/or the corresponding document. In some embodiments, document link 720 may be used in a web browser and/or via the document delivery system 130 corresponding to the recipient.

Figure 8:
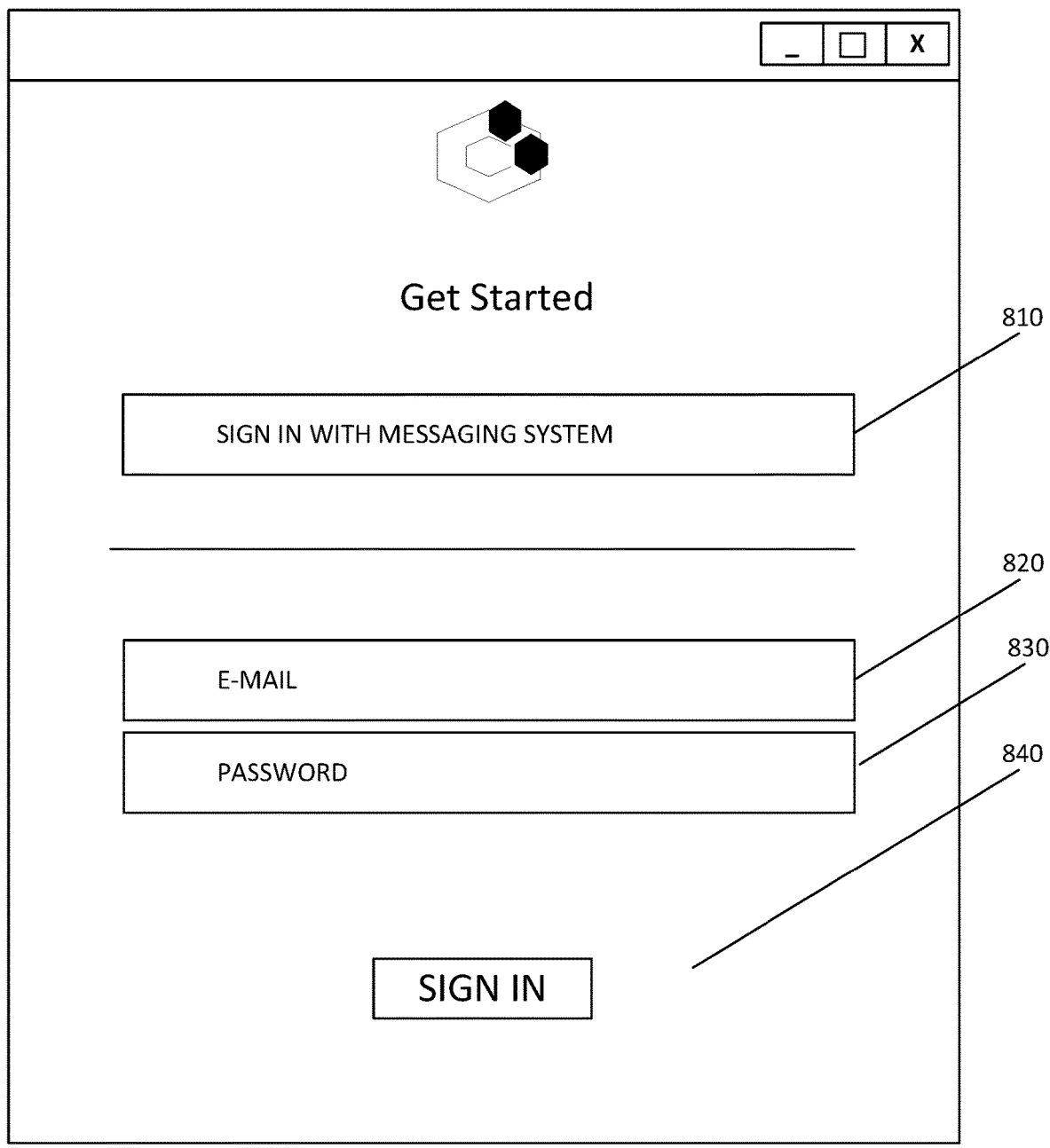
FIG. 8 depicts a block diagram of a graphical user interface for signing into a document linking system, according to some embodiments

FIG. 8 depicts a block diagram of a graphical user interface (GUI) 800 for signing into a document linking system 110, according to some embodiments. A user device accessing a document link may be provided with GUI 800 to receive credentials from a user. GUI 800 may include a single sign on button 810, an username field 820, password field 830, and/or sign in button 840. If a user selects single sign on button 810, the user may intend to use the same credentials corresponding to a document delivery system 130 as credentials for document linking system 110. Upon selecting single sign on button 810, the document delivery system 130 corresponding to the user may provide credentials to document linking system 110. The credentials may include identification information identifying the user. For example, this may include a name and/or image.

In some embodiments, rather than using a single sign on process, the user may create an account with document linking system 110. The user may supply an email address or username using username field 820 to sign into document linking system 110. Similar, the user may supply a password using password field 830. Selecting sign in button 840 may deliver this information to document linking system 110 to provide credentials to document linking system 110. As previously explained, document linking system 110 may use the provided credentials and/or the single sign on credentials to log interactions with the document.

Figure 9A:
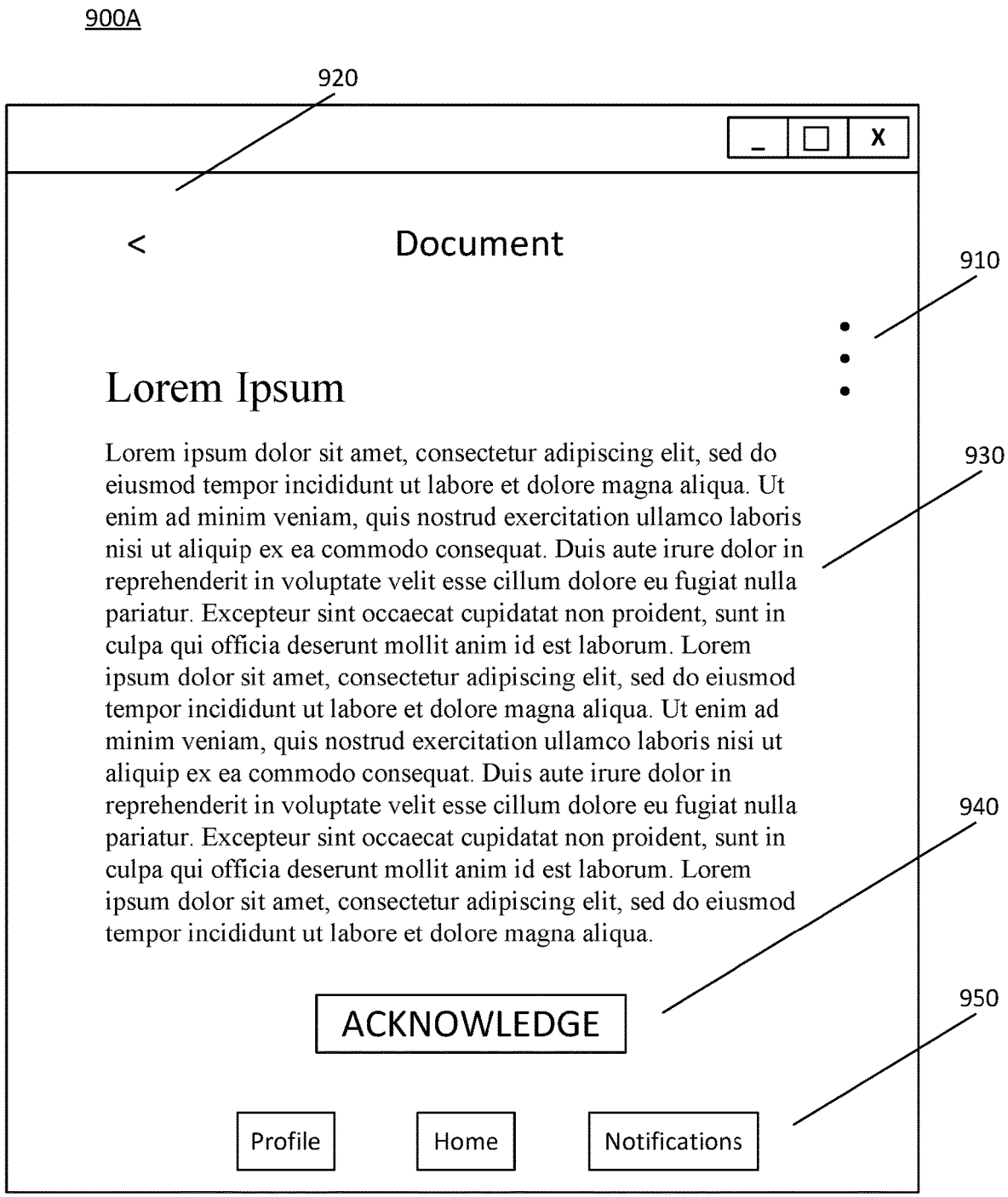
FIG. 9A depicts a block diagram of a graphical user interface displaying a document corresponding to a document link, according to some embodiments.

FIG. 9A depicts a block diagram of a graphical user interface (GUI) 900A displaying a document 930 corresponding to a document link, according to some embodiments. Document linking system 110 may provide GUI 900A to a user device 140 after receiving corresponding credentials and/or confirming that the user is not restricted from accessing document 930. GUI 900A may include document 930, menu button 910, back button 920, acknowledge button 940, and/or menu bar 950.

Document 930 may have been generated using document linking system 110 and/or provided by a user device 140. If the document 930 has been transmitted for acknowledgment, GUI 900A may include acknowledge button 940. Selecting acknowledgement button 940 may indicate that the user has acknowledged receipt of document 930.

The user may also select back button 920 to return to a previous screen. This previous screen may be, for example, a home screen and/or a screen with one or more other documents corresponding to the user. Menu bar 950 may be similar to menu bar 650. In some embodiments, GUI 900A may include menu button 910. Selecting menu button 910 may display a menu overlay as further described with reference to FIG. 9B.

Figure 9B:
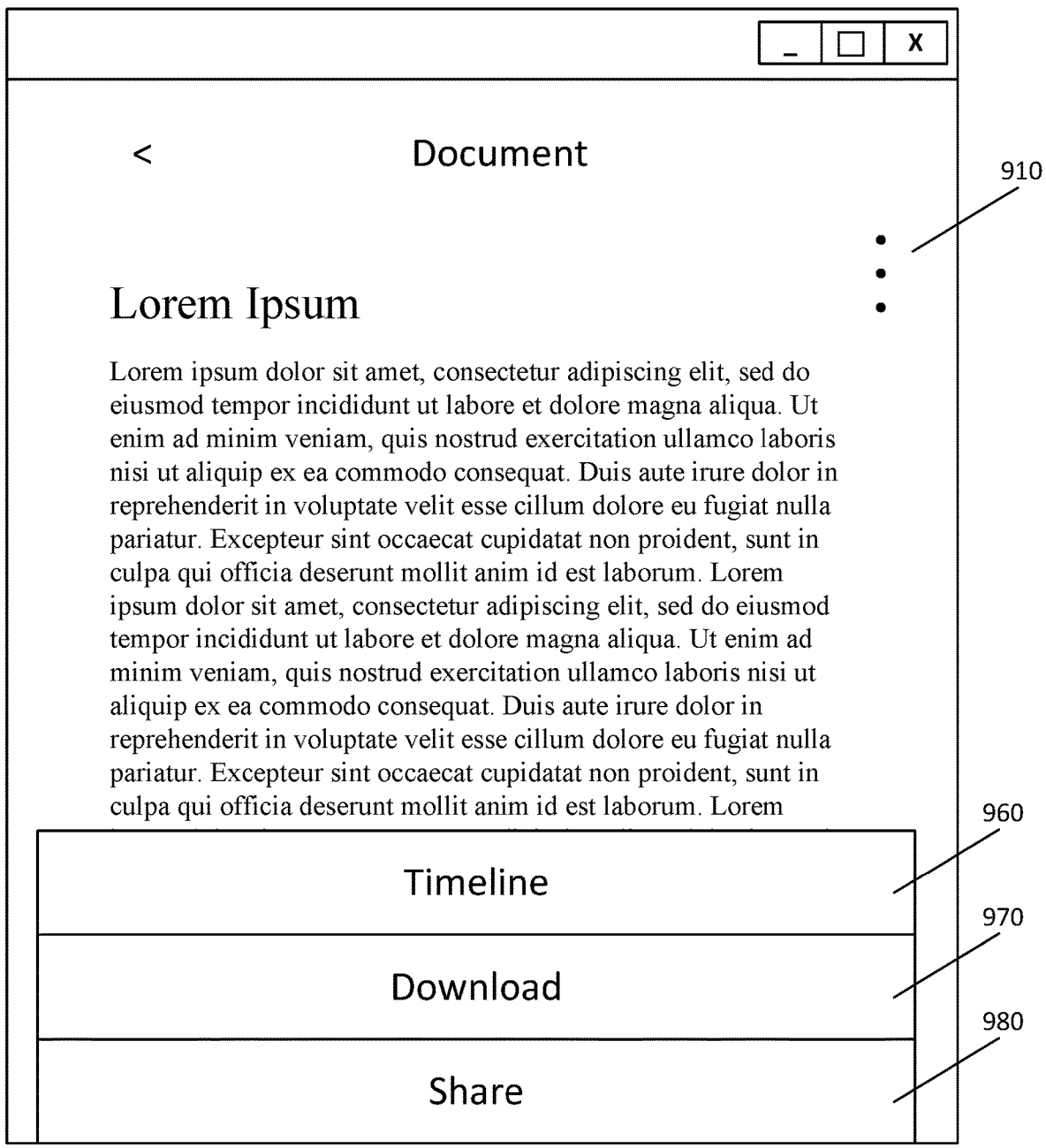
FIG. 9B depicts a block diagram of a graphical user interface displaying a menu overlaying the document, according to some embodiments.

FIG. 9B depicts a block diagram of a graphical user interface (GUI) 900B displaying a menu overlaying the document, according to some embodiments. Selecting menu button 910 may display this menu. The menu overlaying the document may include a timeline button 960, a download button 970, and/or a share button 980. As will be further described with reference to FIG. 10, selecting the timeline button 960 may present a document flow to view the logged transactions corresponding to the document. Selecting download button 970 may allow the user to download a local copy of the document to the corresponding user device 140. Selecting share button 980 may allow a user to identify users to receive the document and/or the document link. In some embodiments, this sharing may occur via an address book corresponding to the user account. In some embodiments, selecting the share button 980 may generate a document link that the user may send using another message.

In some embodiments, one or more of these options may be unavailable depending on the permissions provided for a user. For example, a document owner may have permission to use each of these functions. A downstream user, however, may not be allowed to use each of these functions. For example, depending on the permissions corresponding to the user, the user may not be able to view the document flow data, may not be able to download the document, and/or may not use the share functionality. As previously explained, modifications to these permissions may be made as the document is disseminated.

Figure 10:
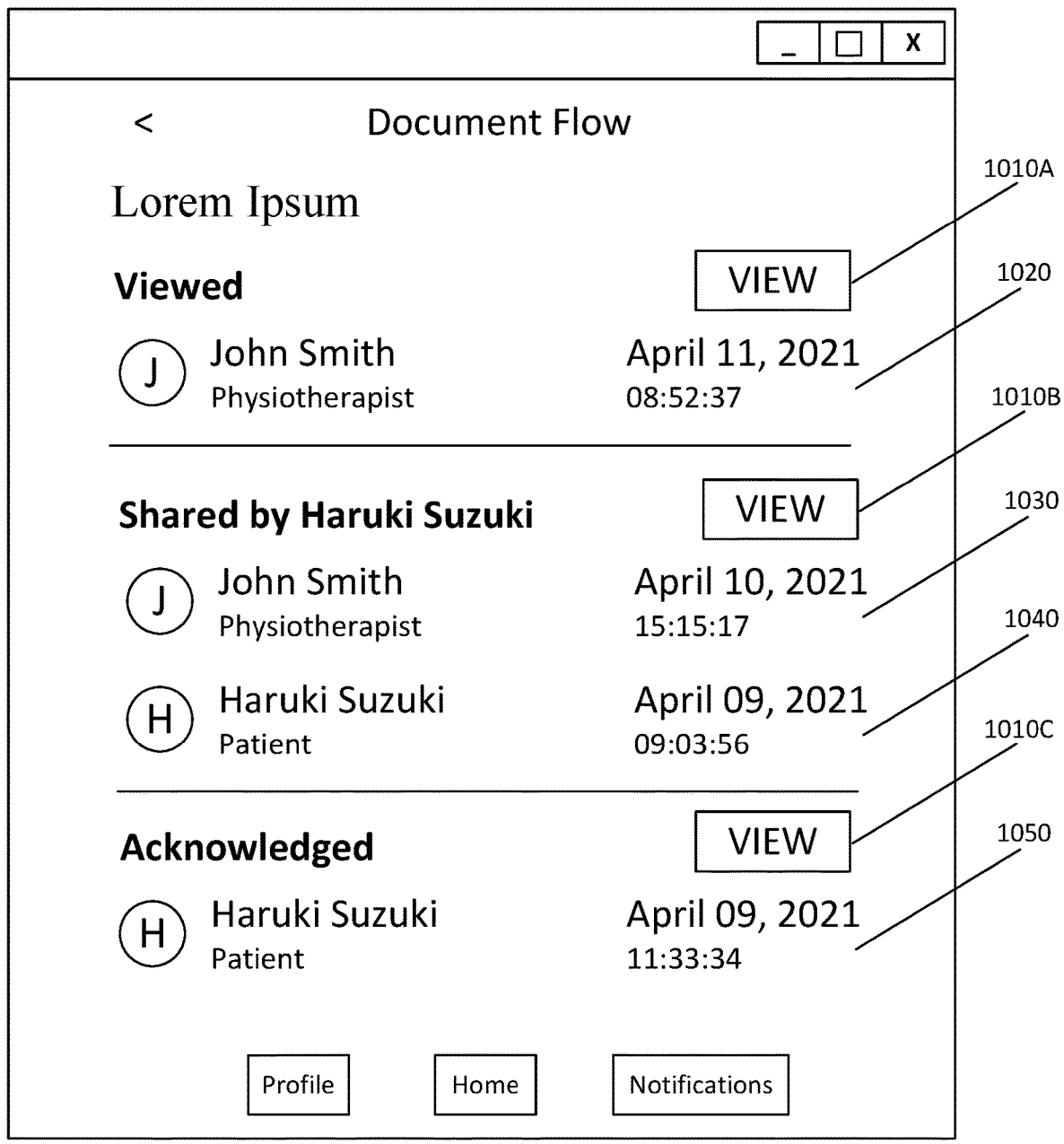
FIG. 10 depicts a block diagram of a graphical user interface displaying a document flow, according to some embodiments.

FIG. 10 depicts a block diagram of a graphical user interface (GUI) 1000 displaying a document flow, according to some embodiments. The document flow displayed may correspond to a document flow data structure. The document flow data structure may track and/or log interactions 1020, 1030, 1040 with a document. The information tracked may include user identification information, user credentials, a timestamp corresponding to the interaction and/or a tracking of a modification applied to the document. In some embodiments, the document flow data structure may also track document participants and/or events such as creation, viewing, signing, sharing or downloading. The document flow data structure may also track times, dates, and/or locations like the latitude and longitude of digitally transmitted information. For example, the document flow data structure may track global positioning coordinates related to a document and/or a document interaction event. This may be viewable via GUI 1000.

For example, GUI 1000 may track interactions 1020, 1030, 1040 where a user has viewed the document, shared the document, and/or modified the document. For example, GUI 1000 may display view interactions 1020, share interactions 1030, and/or modification interactions 1040. In some embodiments, an acknowledgment and/or a signature may be a modification. Viewing GUI 1000, a user may view the interactions logged in the document flow data structure. GUI 1000 may arrange this information with view buttons 1010A, 1010B, 1010C. Selecting a view button 1010 may allow a user to view the state of the document corresponding to different interactions.

In some embodiments, GUI 1000 may present interactions 1020, 1030, 1040 in a timeline view to track the sequence of modifications. In some embodiments, GUI 1000 may categorize interactions 1020, 1030, 1040 by type. In some embodiments, a user may sort and/or filter the interactions corresponding to the document.

Figure 11A:
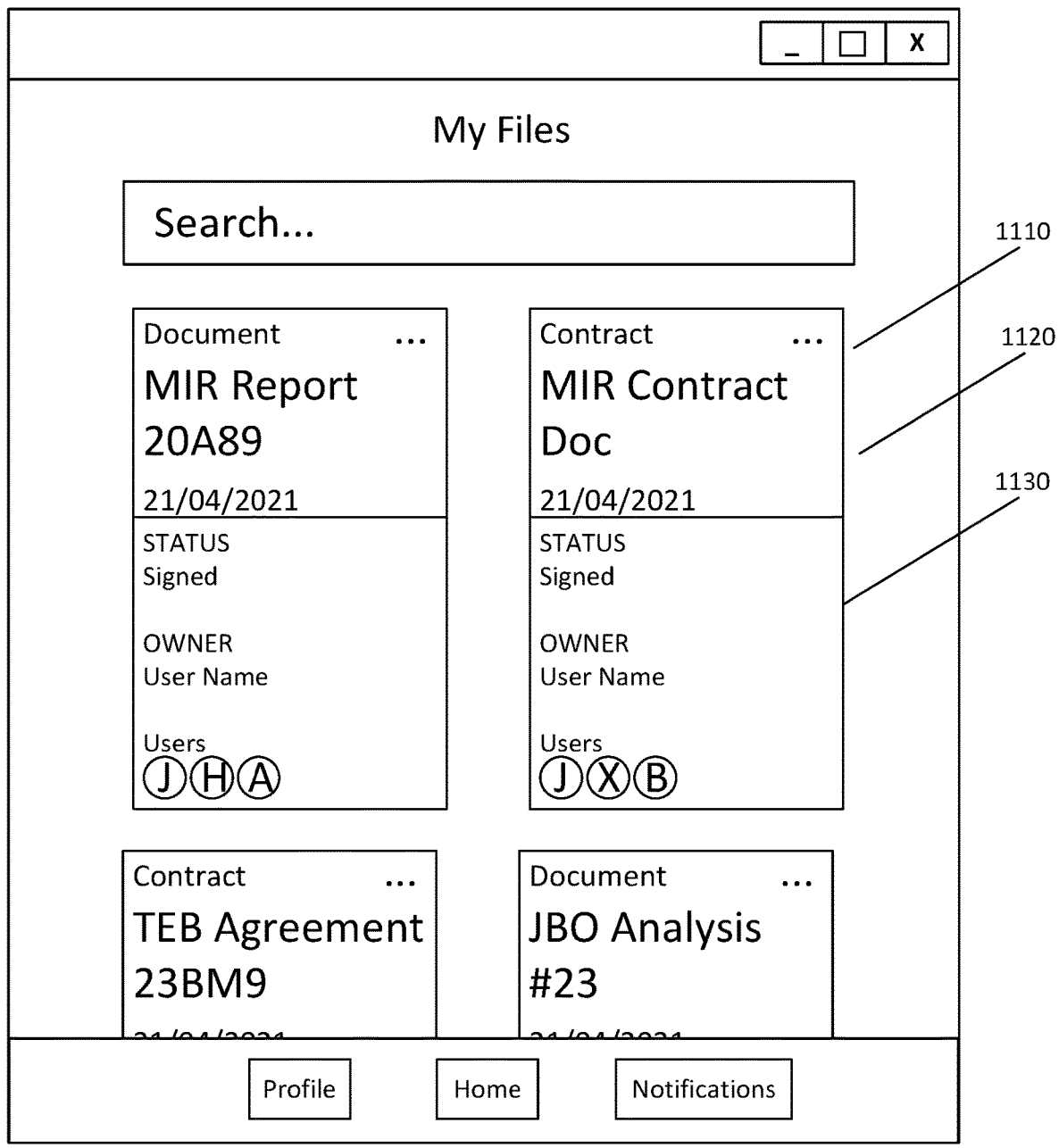
FIG. 11A depicts a block diagram of a graphical user interface displaying documents corresponding to a user, according to some embodiments.

FIG. 11A depicts a block diagram of a graphical user interface (GUI) 1100A displaying documents corresponding to a user, according to some embodiments. In some embodiments, GUI 1100A may be displayed when a home button is selected on a menu bar.

GUI 1100A may display documents as tiles with each tile corresponding to a different document. A tile may include a menu button 1110, a header portion 1120, and/or a status portion 1130. The header portion 1120 may include information related to the document. For example, the header portion 1120 may include a document title, a date of creation and/or last update, and/or a document type. The document type may, for example, indicate whether the document is a contract document. The status portion 1130 may provide status information and/or other information related to users interacting with the document. For example, the status information may indicate whether a document has been acknowledged or signed. The status portion 1130 may also indicate a document owner based on a user name and/or other identification information. In some embodiments, status portion 1130 may also display users that have interacted with the document. For example, status portion 1130 may display profile pictures depicting the users that have interacted with the document.

In some embodiments, each tile may include a menu button 1110. Menu button 1110 may be similar to menu button 910. Selecting menu button 1110 may provide similar functionality when viewing documents as tiles. As described with reference to FIG. 11B, selecting a menu button 1110 may display a menu corresponding to the particular document corresponding to the selected menu button 1110.

Figure 11B:
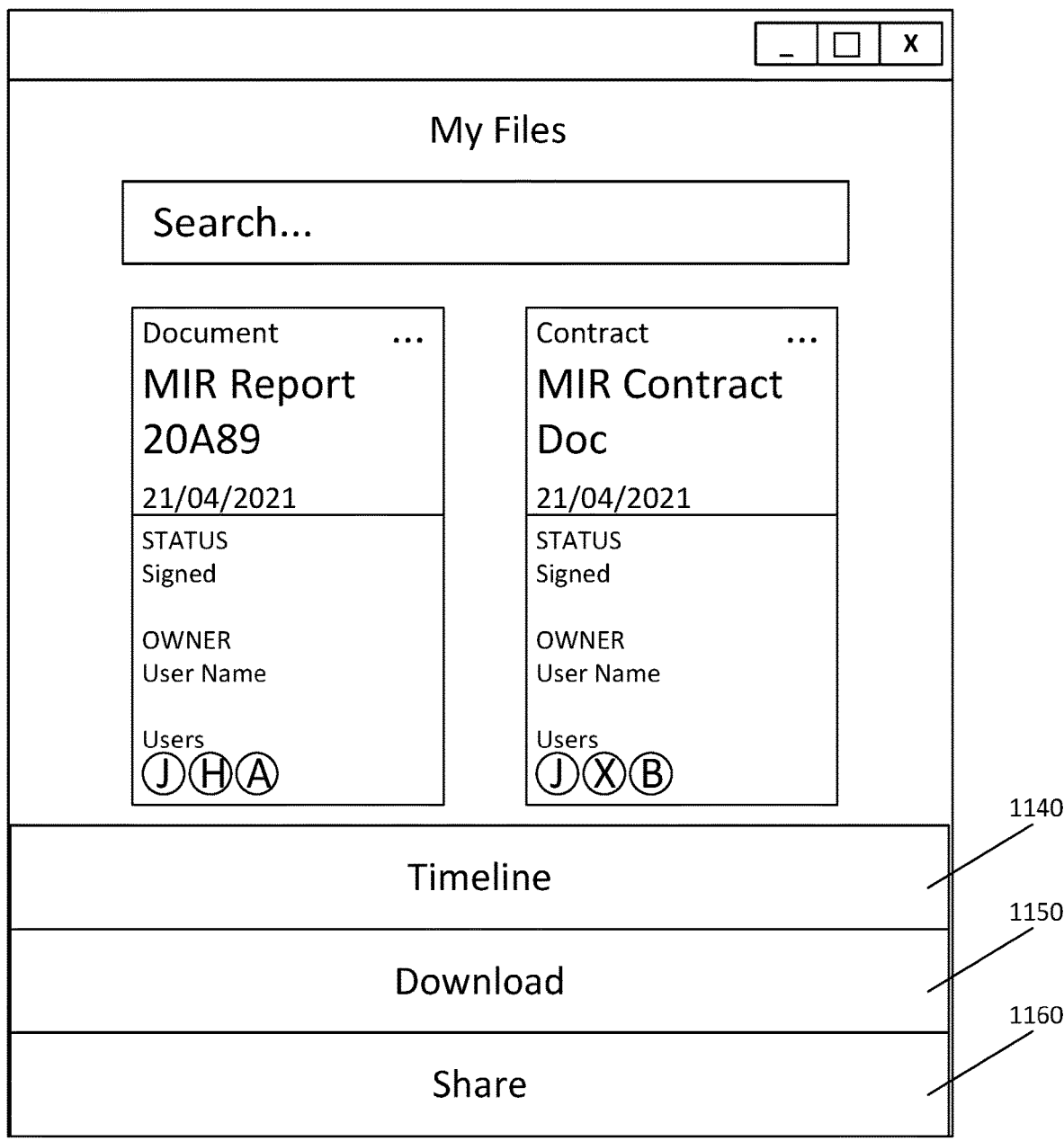
FIG. 11B depicts a block diagram of a graphical user interface displaying a menu overlaying the documents corresponding to the user, according to some embodiments.

FIG. 11B depicts a block diagram of a graphical user interface (GUI) 1100B displaying a menu overlaying the documents corresponding to the user, according to some embodiments. The menu displayed may correspond to a menu button 1110 selected for a particular document. Similar to the menu described with reference to FIG. 9B, the menu presented in GUI 1100B may include a timeline button 1140, a download button 1150, and/or a share button 1160. As previously described with reference to FIG. 10, selecting the timeline button 1140 may present a document flow to view the logged transactions corresponding to the document. Selecting download button 1150 may allow the user to download a local copy of the document to the corresponding user device 140. Selecting share button 1160 may allow a user to identify users to receive the document and/or the document link. In some embodiments, this sharing may occur via an address book corresponding to the user account. In some embodiments, selecting the share button 1160 may generate a document link that the user may send using another message.

In some embodiments, one or more of these options may be unavailable depending on the permissions provided for a user. For example, a document owner may have permission to use each of these functions. A downstream user, however, may not be allowed to use each of these functions. For example, depending on the permissions corresponding to the user, the user may not be able to view the document flow data, may not be able to download the document, and/or may not use the share functionality. As previously explained, modifications to these permissions may be made as the document is disseminated.

Figure 12:
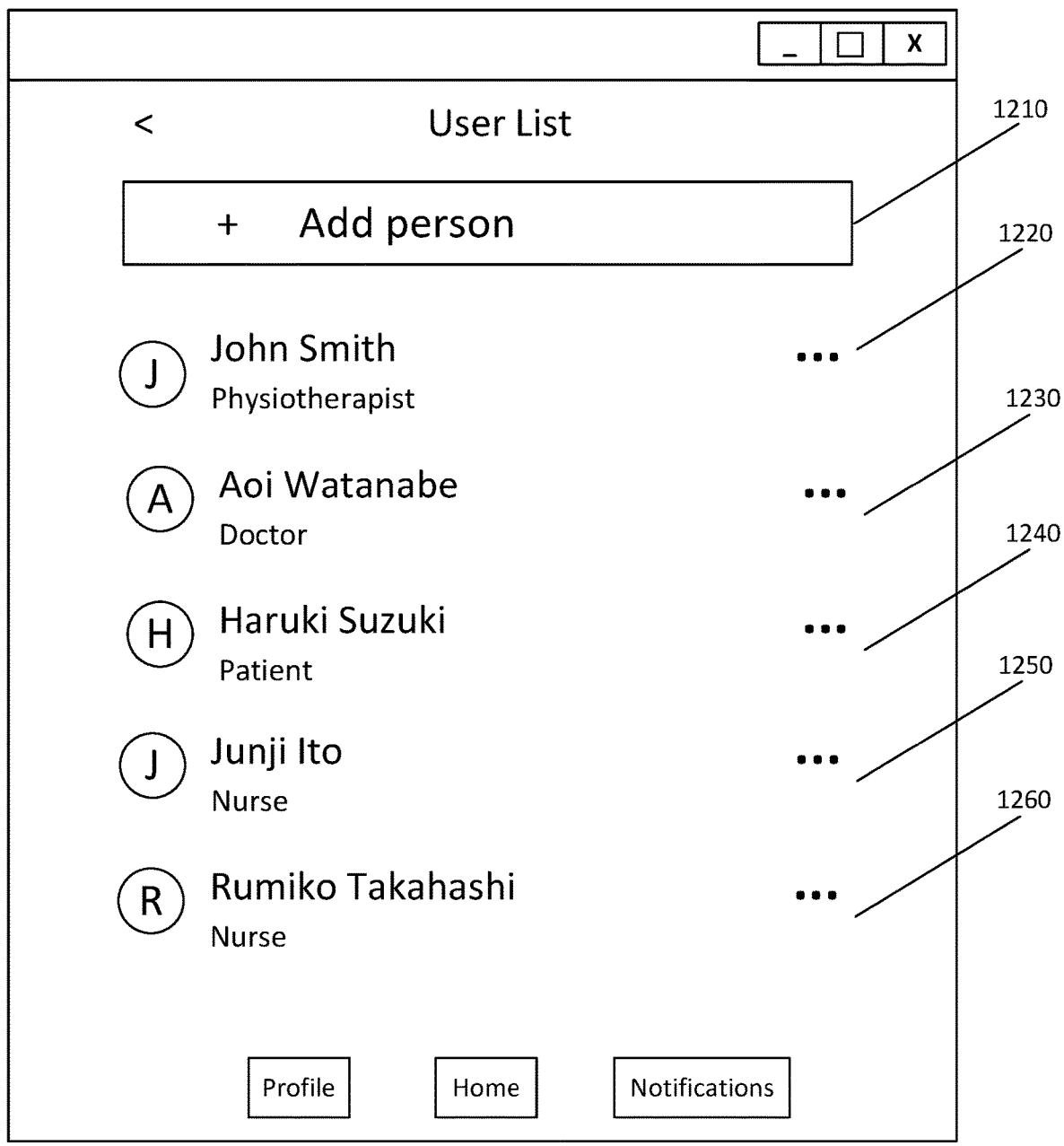
FIG. 12 depicts a block diagram of a graphical user interface for sharing a document to different users, according to some embodiments.

FIG. 12 depicts a block diagram of a graphical user interface (GUI) 1200 for sharing a document to different users, according to some embodiments. In some embodiments, GUI 1200 may be accessed when selecting a share button corresponding to a document. GUI 1200 may be used to identify users to receive a document and/or a document link. GUI 1200 may be populated with user profiles 1220, 1230, 1240, 1250, 1260. User profiles 1220, 1230, 1240, 1250, 1260 may include a name and/or a role corresponding to a user. One or more of the user profiles 1220, 1230, 1240, 1250, 1260 may be selected to receive the document and/or the document link.

GUI 1200 may include an addition button 1210. Selecting addition button 1210 may allow a user to find and/or add another user to a corresponding address book. Selecting addition button 1210 may generate GUI 1300 as further described with reference to FIG. 13.

Figure 13:
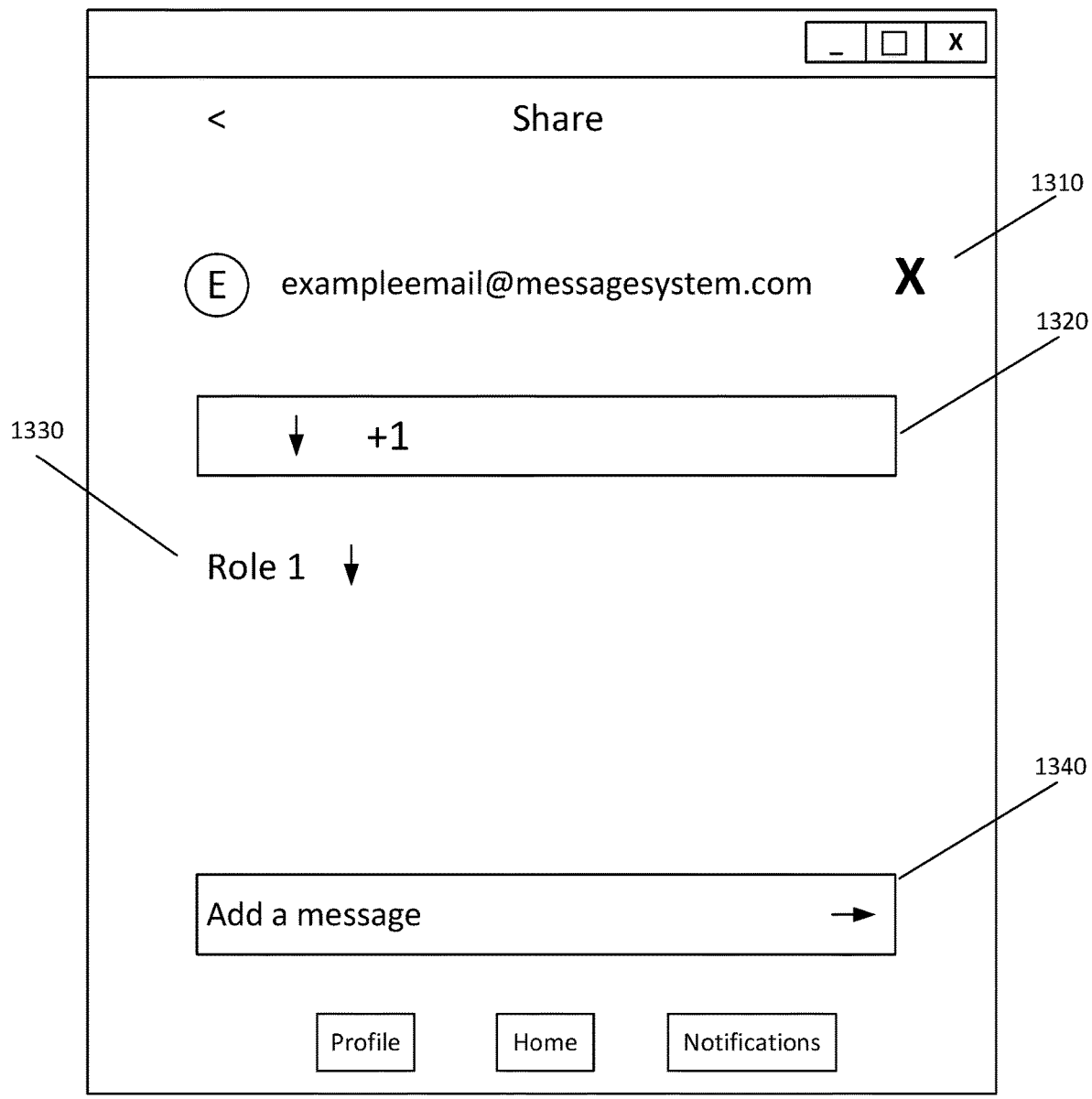
FIG. 13 depicts a block diagram of a graphical user interface for adding a new user for sharing a document, according to some embodiments.

FIG. 13 depicts a block diagram of a graphical user interface (GUI) 1300 for adding a new user for sharing a document, according to some embodiments. GUI 1300 may include an address field 1310, phone number field 1320, role field 1330, and/or a message field 1340. In the address field 1310, a user may specify an address, such as an email address or social media identification to deliver the message and/or the document link. In some embodiments, a user may deliver the message and/or the document link via a text message to a mobile device. In this case, the user may include a phone number in phone number field 1320. In some embodiments, phone number field 1320 may include a drop down menu allowing for specification of a country corresponding to the phone number.

GUI 1300 may include role field 1330. Role field 1330 may allow a user to specify a role for the user accessing the document. In some embodiments, the role may designate the permissions corresponding to document interactions. For example, an acknowledger role may limit interactions with the document to viewing and/or acknowledging receipt of the document. In some embodiments, role field 1330 may be a drop down menu allowing a user to specify a role for the recipient of the document and/or document link. GUI 1300 may also include message field 1340. Message field 1340 may allow the user to add a message to the recipient receiving the document and/or document link. Message field 1340 may also be used to transmit the message. A user receiving the message and/or the document link may access the document in the manner described above.

Figure 14:
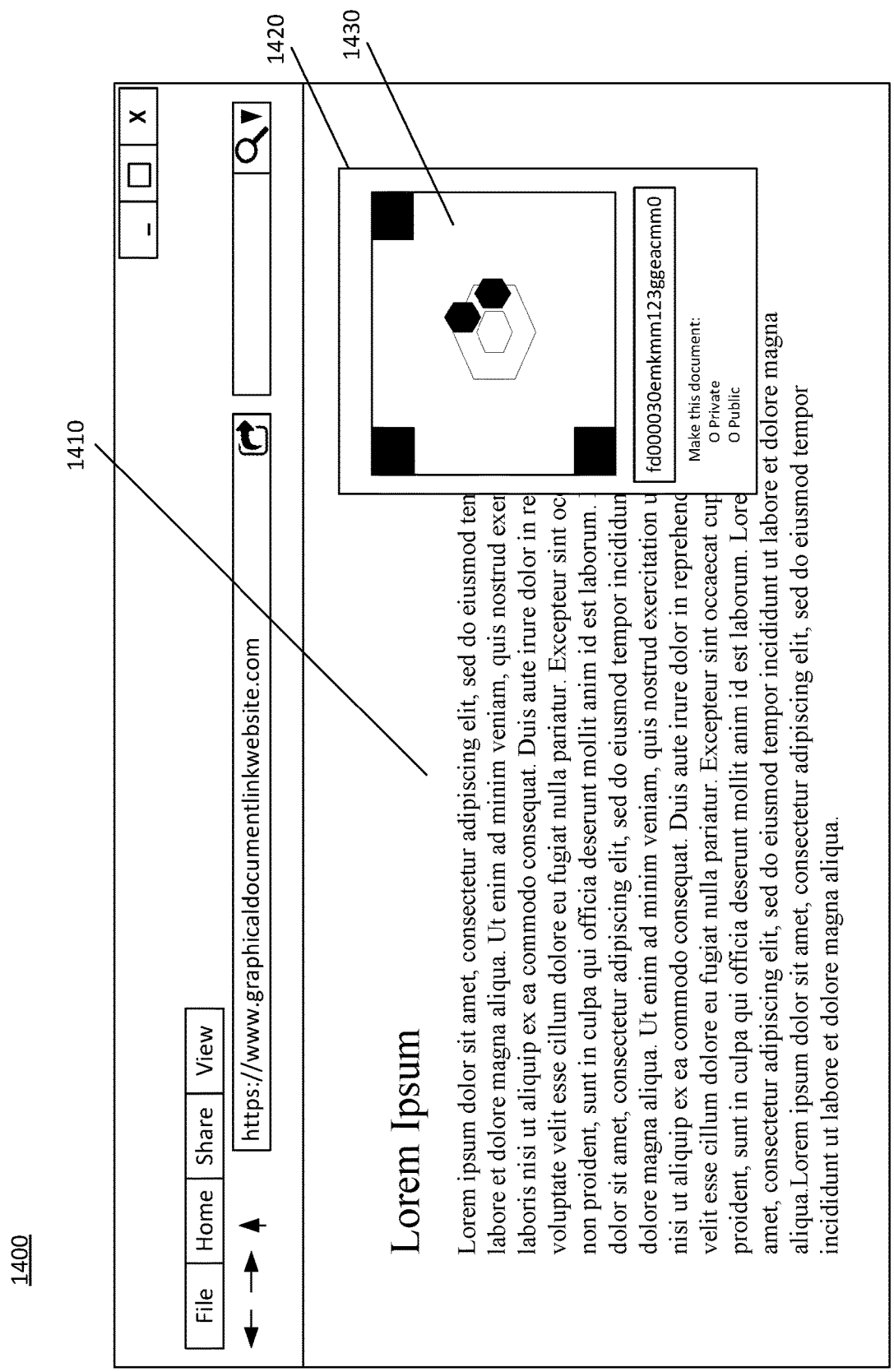
FIG. 14 depicts a block diagram of a graphical user interface with a graphical document link, according to some embodiments.

FIG. 14 depicts a block diagram of a graphical user interface (GUI) 1400 with a graphical document link 1430, according to some embodiments. GUI 1400 may be used by a user who has provided a document 1410 to document linking system 110. For example, a user may view GUI 1400 using a user device 140. GUI 1400 may display document 1410, link generation object 1420, and/or a graphical document link 1430. Using GUI 1410, the user may provide commands to document linking system 110 to generate graphical document link 1430.

Graphical document link 1430 may operate similar to the document link previously described. Graphical document link 1430 may be a two-dimensional image that may be used to link a recipient to document 1410. In some embodiments, graphical document link 1430 may be a two-dimensional bar code. For example, graphical document link 1430 may be a QR code. To generate graphical document link 1430, a user may interact with link generation object 1420. Link generation object 1420 may be GUI object with one or more parameters that the user may set to generate graphical document link 1430. For example, link generation object 1420 may allow a user to set whether the document is private or public. As further explained below, this designation may affect the response of document linking system 110 when a user attempts to access document 1410 via graphical document link 1430. In some embodiments, link generation object 1420 may include a serial number and/or link corresponding to graphical document link 1430. For example, link generation object 1420 may list a URL corresponding to link generation object 1420.

Once a user has submitted document 1410, document linking system 110 may generate graphical document link 1430 for the user to disseminate. Document linking system 110 may generate graphical document link 1430 in a manner similar to those described with reference to FIG. 2 and FIG. 3A. Upon generating graphical document link 1430, document linking system 110 may provide graphical document link 1430 to the user via user device 140. In some embodiments, graphical document link 1430 may be an image that the user may disseminate. For example, a user device 140A may receive graphical document link 1430 from document linking system 110. In some embodiments, this may occur via document delivery system 130A. In some embodiments, user device 140A may receive graphical document link 1430 directly from document linking system 110 using GUI 1400.

After receiving graphical document link 1430, user device 140A may then transmit the graphical document link 1430 to user device 140B to disseminate the graphical document link 1430. For example, user device 140A may disseminate graphical document link 1430 in a similar manner as those described with reference to disseminating a document link. In some embodiments, this may occur via document delivery system 130A and/or 130B. In some embodiments, user device 140A may post graphical document link 1430 to a website and/or create a social media post including graphical document link 1430. In some embodiments, user device 140A may print graphical document link 1430 onto a physical medium such as paper or a poster.

After disseminating graphical document link 1430, a second user may attempt to access document 1410 using graphical document link 1430. In some embodiments, the second user may use user device 140B to scan graphical document link 1430. For example, user device 140B may scan graphical document link 1430 using a camera. This scan may extract a URL corresponding to document 1410 and/or document linking system 110. In some embodiments, scanning graphical document link 1430 may generate GUI 800 as described with reference to FIG. 8. Document linking system 110 may then request credentials from the second user. In some embodiments, this may occur when the document 1410 is designated as private. Upon supplying the credentials, document linking system 110 may determine whether the user is permitted to access document 1410. If document 1410 has been designated as public, the user may still be prompted to supply credentials after scanning graphical document link 1430. For either the private or public designation, these credentials may be tracked in a document flow data structure as previously described. After supplying acceptable credentials, document linking system 110 may reveal document 1410 similar to the manner described with reference to FIG. 9A.

Upon viewing document 1410, the user may interact with document 1410 in a similar manner to those described above. These interactions may correspond to permission designations. For example, some users may be permitted to view document 1410 while others may be permitted to modify document 1410. In some embodiments, this modification may be applying a signature or acknowledging receipt of the document. Document linking system 110 may track interactions with document 1410 in a document flow data structure. Similar to the document flow data structure described above, this document flow data structure may track document participants and/or events such as creation, viewing, signing, sharing or downloading. The document flow data structure may also track times, dates, and/or locations like the latitude and longitude of digitally transmitted information. For example, the document flow data structure may track global positioning coordinates related to a document and/or a document interaction event. Document linking system 110 may generate a GUI displaying the data from the document flow data structure to the owner of document 1410. The owner may then adjust document access as described above.

Using graphical document link 1430, a user may disseminate and/or track interactions with a document in a user friendly and streamlined manner. In some embodiments, a realtor or seller may create document 1410. Document 1410 may include property information. Document 1410 may include additional attachments. These attachments may be embedded in document 1410 and/or may be linked in document 1410. Document linking system 110 may provide an attachment to a user if a link is selected. In some embodiments, the attachment may be an owner's disclosure report, property survey, appraisal, and/or other types of documents. The realtor or seller may then generate graphical document link 1430 using document linking system 110. The realtor or seller may then disseminate graphical document link 1430 to potential buyers. This may be via digital messages and/or via printing the graphical document link 1430 onto a physical medium. For example, the realtor or seller may promote document 1410 via social media, For Sale signs, MLS listings, marketing brochures and materials, and/or other digital or physical media. Interested parties, consumers, and/or buyers may then scan graphical document link 1430 to quickly access document 1410. In some embodiments, when graphical document link 1430 is a QR code, the scan may be a QR scan. Upon scanning graphical document link 1430, the interested party may access information that may not be available on public portals. For example, if document 1410 is a private listing, this private listing may be shared while still being controlled by document linking system 110. In some embodiments, document linking system 110 may allow for collaboration and/or engagement of the realtor or seller. This may help to facilitate a knowledge transfer regarding details about the property described in document 1410. Further, the interested party may also submit an offer using document linking system 110.

For the realtor or seller, document linking system 110 may track interactions with document 1410 using the document flow data structure. As previously explained, this document flow data structure may track document participants and/or events such as creation, viewing, signing, sharing or downloading. The document flow data structure may also track times, dates, and/or locations like the latitude and longitude of digitally transmitted information. For example, the document flow data structure may track global positioning coordinates related to a document and/or a document interaction event. This information may help the realtor or seller to track exclusive buyer leads and/or to expand their personal market. This may further help to sell the property described in document 1410 in a faster manner.

While this example describes document 1410 describing property, document 1410 may also be used to describe off market sales. In some embodiments, document 1410 may also be used for the sale of cars, jewelry, art, and/or other high value assets.

Figure 15:
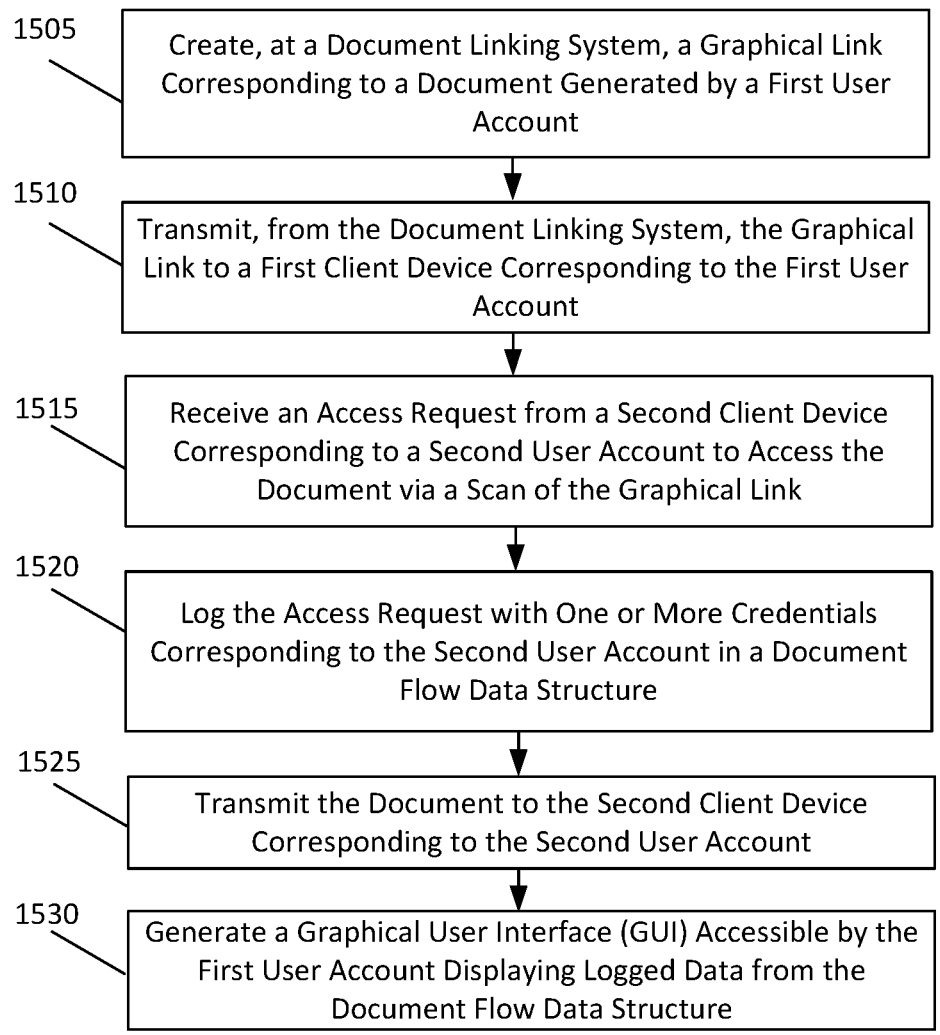
FIG. 15 depicts a flowchart illustrating a method for generating a graphical document link, according to some embodiments.

FIG. 15 depicts a flowchart illustrating a method 1500 for generating a graphical document link, according to some embodiments. Method 1500 shall be described with reference to FIG. 1A and FIG. 14; however, method 1500 is not limited to that example embodiment.

In an embodiment, document linking system 110 may generate graphical document link 1430 as described with reference to FIG. 14. Document linking system 110 may track downstream access via the graphical document link 1430. This access may correspond to accessing, viewing, downloading, sharing, acknowledging, signing, editing, and/or modifying document 1410. While method 1400 is described with reference to document linking system 110, method 1400 may be executed on any computing device, such as, for example, the computer system described with reference to FIG. 16 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 15, as will be understood by a person of ordinary skill in the art.

At 1505, document linking system 110 may create a graphical link corresponding to a document generated by a first user account. The graphical link may be graphical document link 1430. The document may be document 1410. The first user account may correspond to user device 140A. Document linking system 110 may generate graphical document link 1430 in a manner similar to that described with reference to FIGS. 1A, 2, and 14. At 1510, document linking system 110 may transmit the graphical link to a first client device corresponding to the first user account. The first client device may be user device 140A. This transmission may occur via document delivery system 130A. In some embodiments, document linking system 110 may populate a message in a messaging application corresponding to document delivery system 130A. For example, document linking system 110 may embed graphical document link 1430 in a message. In some embodiments, user device 140A may disseminate graphical document link 1430 to other users as described with reference to FIG. 14.

At 1515, document linking system 110 may receive an access request from a second client device corresponding to a second user account to access the document via a scan of the graphical link. In this case, the second client device may correspond to user device 140B. The scan may be performed using a camera on user device 140B. This may be a scan of a physical medium such as a paper or poster. Graphical document link 1430 may have been printed on the paper or poster. Upon scanning the graphical document link 1430, document linking system 110 may request log-in credentials for the user. These log-in credentials may correspond to document linking system 110. In some embodiments, the log-in credentials may correspond to document delivery system 130B servicing user device 140B. In this manner, if document delivery system 130B interfaces with document linking system 110, document delivery system 130B may provide a single sign on process for user device 140B.

At 1520, document linking system 110 may log the access request with one or more credentials corresponding to the second user account in a document flow data structure. As described with reference to FIG. 1A and FIG. 14, the access request may correspond to a permission set by document linking system 110. For example, if the permission may be set for access requests to correspond to viewing the document, document linking system 110 may identify the access request as a viewing performed by user device 140B. As previously explained, document linking system 110 may log this viewing in a document flow data structure with credentials corresponding to the user and/or a time stamp corresponding to the interaction. In some embodiments, the access request may correspond to accessing, viewing, downloading, sharing, acknowledging, signing, editing, and/or modifying the document. In this case, document linking system 110 may log this interaction for the document. The document flow data structure may also track document participants and/or events such as creation, viewing, signing, sharing or downloading. The document flow data structure may also track times, dates, and/or locations like the latitude and longitude of digitally transmitted information. For example, the document flow data structure may track global positioning coordinates related to the access request.

At 1525, document linking system 110 may transmit the document to the second client device corresponding to the second user account. Document linking system 110 may transmit the document according to the permissions set by the first user account. The second user account may interact with the document according to the permission. The second user account may also further disseminate the document link to other client devices. In this case, document linking system 110 may receive a request to access the document from other client devices.

At 1530, document linking system 110 may generate a graphical user interface (GUI) accessible by the first user account displaying logged data from the document flow data structure. For example, using user device 140A, the first user account or document owner may view the GUI. An example of this GUI is described with reference to FIG. 10. Using the GUI, the first user account may set permissions corresponding to document access. As previously explained, these permissions may correspond to the document and/or may be individualized corresponding to each user account. Using this GUI, a document owner may track interactions with the document. These interactions may be different and/or may be timestamped to reflect the interaction. In some embodiments, global positioning locations may also be tracked with these interactions.

Figure 16:
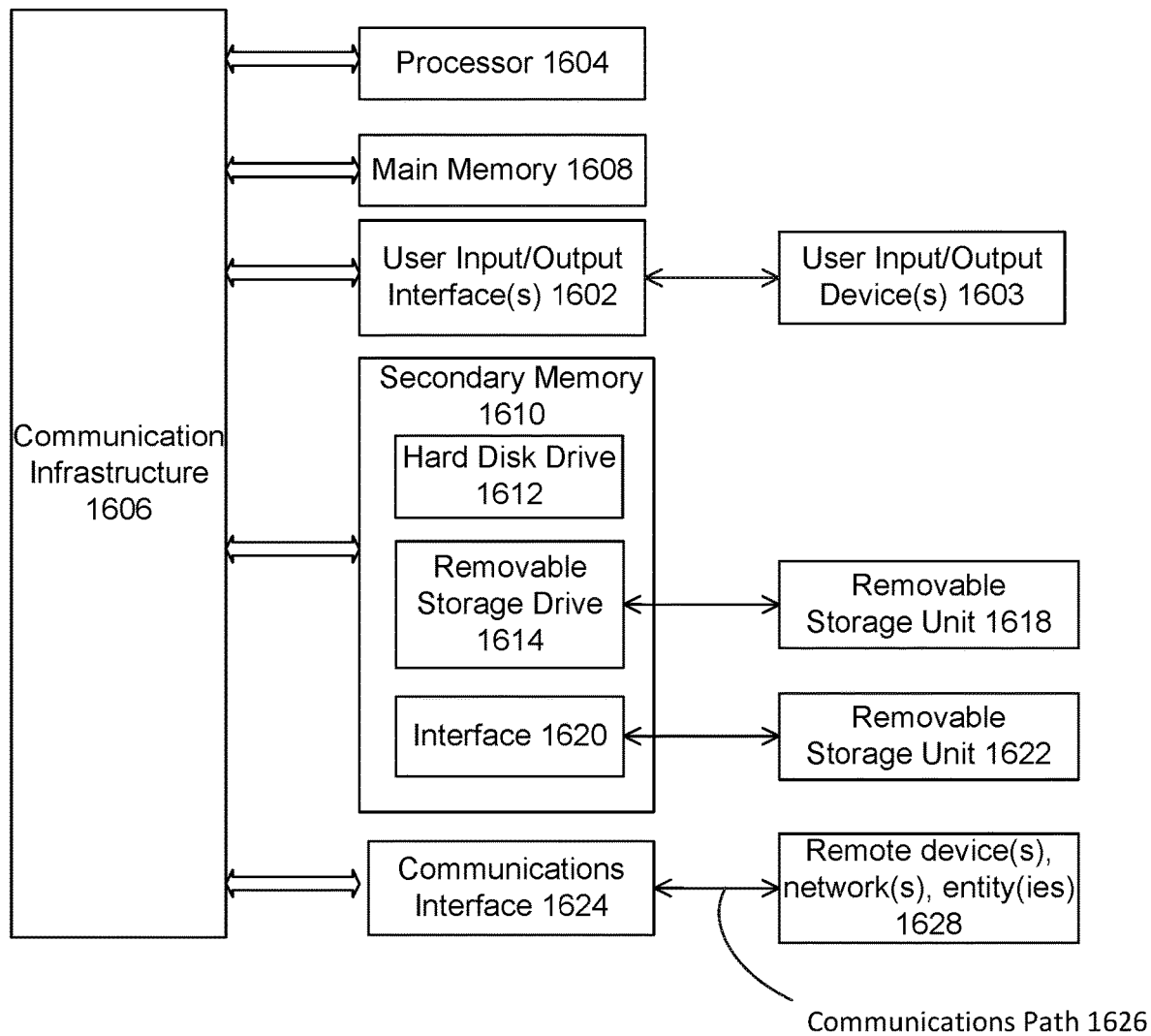
FIG. 16 depicts an example computer system useful for implementing various embodiments.

Various embodiments may be implemented, for example, using one or more well-known computer systems, such as computer system 1600 shown in FIG. 16. One or more computer systems 1600 may be used, for example, to implement any of the embodiments discussed herein, as well as combinations and sub-combinations thereof.

Computer system 1600 may include one or more processors (also called central processing units, or CPUs), such as a processor 1604. Processor 1604 may be connected to a communication infrastructure or bus 1606.

Computer system 1600 may also include user input/output device(s) 1603, such as monitors, keyboards, pointing devices, etc., which may communicate with communication infrastructure 1606 through user input/output interface(s) 1602.

One or more of processors 1604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 may also include a main or primary memory 1608, such as random access memory (RAM). Main memory 1608 may include one or more levels of cache. Main memory 1608 may have stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 may include a computer usable or readable storage device having stored thereon computer software (control logic) and/or data. Removable storage unit 1618 may be a floppy disk, magnetic tape, compact disk, DVD, optical storage disk, and/any other computer data storage device. Removable storage drive 1614 may read from and/or write to removable storage unit 1618.

Secondary memory 1610 may include other means, devices, components, instrumentalities or other approaches for allowing computer programs and/or other instructions and/or data to be accessed by computer system 1600. Such means, devices, components, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 may enable computer system 1600 to communicate and interact with any combination of external devices, external networks, external entities, etc. (individually and collectively referenced by reference number 1628). For example, communication interface 1624 may allow computer system 1600 to communicate with external or remote devices 1628 over communications path 1626, which may be wired and/or wireless (or a combination thereof), and which may include any combination of LANs, WANs, the Internet, etc. Control logic and/or data may be transmitted to and from computer system 1600 via communication path 1626.

Computer system 1600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 16. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving, at a document linking system, a document creation request via a user selection of a graphical user interface (GUI) object integrated into an application managed by a document delivery system, wherein the document linking system has provided instructions to the document delivery system to generate the GUI object;
receiving, at the document linking system, a document;
creating, at the document linking system, a first document token corresponding to the document, wherein the first document token is a hash of the document;
transmitting, from the document linking system to the document delivery system, a link corresponding to the first document token, to populate a message in the application, wherein accessing the link provides access to the document;
logging with the request one or more location coordinates corresponding to a location of a client device corresponding to a user account with one or more credentials corresponding to the user account in a document flow data structure tracking interactions with the document, wherein the document flow data structure is stored on a blockchain;
receiving, at the document linking system, a request to access the document via a user selection of the link, wherein the request is associated with the user account;
transmitting, from the document linking system, the document to a client device corresponding to the user account;
receiving, at the document linking system, a modification of a portion of the document;
logging, at the document linking system, the modification with one or more credentials corresponding to the user account in the document flow data structure tracking interactions with the document, wherein the document flow data structure tracks interaction types including document permission, user credentials, timestamp of interaction, acknowledgement of document receipt, acknowledgement of document execution, and the modification of the portion of the document; and generating, at the document linking system, a document flow report including all of the tracked interaction types for the document.

2. The computer implemented method of claim 1, further comprising:

receiving, at the document linking system, a request to access the document via a user selection of the link, wherein the request is associated with the user account; and logging, at the document linking system, the request with one or more credentials corresponding to the user account in the document flow data structure tracking interactions with the document.

3. The computer implemented method of claim 2, wherein the one or more credentials are provided to the document linking system by the document delivery system.

4. The computer implemented method of claim 1, further comprising:

receiving, at the document linking system, a first request to access the document via a first user selection of the link, wherein the first request is associated with a first user account that received the message from the application;

logging, at the document linking system, the first request with one or more credentials corresponding to the first user account in the document flow data structure tracking interactions with the document;

receiving, at the document linking system, a second request to access the document via a second user selection of the link, wherein the second request is associated with a second user account that received the link from the first user account; and logging, at the document linking system, the second request with one or more credentials corresponding to the second user account in the document flow data structure.

5. The computer implemented method of claim 4, further comprising:

receiving, at the document linking system, a designation of a permission restriction for the document for the second user account;

modifying, at the document linking system, the document flow data structure to associate the permission restriction with the one or more credentials corresponding to the second user account;

receiving, at the document linking system, a third request to access the document via selection of the link by the second user account; and transmitting, from the document linking system, the document to the second user account while restricting functionality based on the permission restriction designated in the document flow data structure.

6. The computer implemented method of claim 1, further comprising:

creating, at the document linking system, a second document token corresponding to the modification; and updating, at the document linking system, an association for the link such that accessing the link corresponds to an access request for the modification.

7. The computer implemented method of claim 1, wherein the modification includes a signature applied to the document or an acknowledgement of receiving the document.

8. A document linking system, comprising:

a memory; and at least one processor coupled to the memory and configured to:

receive a document creation request via a user selection of a graphical user interface (GUI) object integrated into an application managed by a document delivery system, wherein the at least one processor has provided instructions to the document delivery system to generate the GUI object;

receive a document;

create a first document token corresponding to the document, wherein the first document token is a hash of the document;

transmit, to the document delivery system, a link corresponding to the first document token, to populate a message in the application, wherein accessing the link provides access to the document;

log with the request one or more location coordinates corresponding to a location of a client device corresponding to a user account with one or more credentials corresponding to the user account in a document flow data structure tracking interactions with the document, wherein the document flow data structure is stored on a blockchain;

receive, at the document linking system, a request to access the document via a user selection of the link, wherein the request is associated with the user account;

transmit, from the document linking system, the document to a client device corresponding to the user account;

receive, at the document linking system, a modification of a portion of the document;

log, at the document linking system, the modification with one or more credentials corresponding to the user account in the document flow data structure tracking interactions with the document, wherein the document flow data structure tracks interaction types including document permission, user credentials, timestamp of interaction, acknowledgement of document receipt, acknowledgement of document execution, and the modification of the portion of the document; and generating, generate, at the document linking system, a document flow report including all of the tracked interaction types for the document.

9. The document linking system of claim 8, wherein the at least one processor is further configured to:

receive a request to access the document via a user selection of the link, wherein the request is associated with the user account; and log the request with one or more credentials corresponding to the user account in the document flow data structure tracking interactions with the document.

10. The document linking system of claim 9, wherein the one or more credentials are provided to the document linking system by the document delivery system.

11. The document linking system of claim 8, wherein the at least one processor is further configured to:

receive a first request to access the document via a first user selection of the link, wherein the first request is associated with a first user account that received the message from the application;

log the first request with one or more credentials corresponding to the first user account in the document flow data structure tracking interactions with the document;
receive a second request to access the document via a second user selection of the link, wherein the second request is associated with a second user account that received the link from the first user account; and
log the second request with one or more credentials corresponding to the second user account in the document flow data structure.

12. The document linking system of claim 11, wherein the at least one processor is further configured to:
receive a designation of a permission restriction for the document for the second user account;
modify the document flow data structure to associate the permission restriction with the one or more credentials corresponding to the second user account;
receive a third request to access the document via selection of the link by the second user account; and
transmit the document to the second user account while restricting functionality based on the permission restriction designated in the document flow data structure.

13. The document linking system of claim 8, wherein the at least one processor is further configured to:
create a second document token corresponding to the modification; and
update an association for the link such that accessing the link corresponds to an access request for the modification.

14. The document linking system of claim 8, wherein the modification includes a signature applied to the document or an acknowledgement of receiving the document.

15. A non-transitory computer-readable device having instructions stored thereon that, when executed by at least one computing device, cause the at least one computing device to perform operations comprising:
receiving, at a document linking system, a document creation request via a user selection of a graphical user interface (GUI) object integrated into an application managed by a document delivery system, wherein the document linking system has provided instructions to the document delivery system to generate the GUI object;
receiving, at the document linking system, a document;
creating, at the document linking system, a first document token corresponding to the document, wherein the first document token is a hash of the document;
transmitting, from the document linking system to the document delivery system, a link corresponding to the first document token, to populate a message in the application, wherein accessing the link provides access to the document;
logging with the request one or more location coordinates corresponding to a location of a client device corresponding to a user account with one or more credentials corresponding to the user account in a document flow data structure tracking interactions with the document, wherein the document flow data structure is stored on a blockchain;
receiving, at the document linking system, a request to access the document via a user selection of the link, wherein the request is associated with the user account;
transmitting, from the document linking system, the document to a client device corresponding to the user account;
receiving, at the document linking system, a modification of a portion of the document;
logging, at the document linking system, the modification with one or more credentials corresponding to the user account in the document flow data structure tracking interactions with the document, wherein the document flow data structure tracks interaction types including document permission, user credentials, timestamp of interaction, acknowledgement of document receipt, acknowledgement of document execution, and the modification of the portion of the document; and
generating, at the document linking system, a document flow report including all of the tracked interaction types for the document.

16. The non-transitory computer-readable device of claim 15, the operations further comprising:
receiving, at the document linking system, a first request to access the document via a first user selection of the link, wherein the first request is associated with a first user account that received the message from the application;
logging, at the document linking system, the first request with one or more credentials corresponding to the first user account in the document flow data structure tracking interactions with the document;
receiving, at the document linking system, a second request to access the document via a second user selection of the link, wherein the second request is associated with a second user account that received the link from the first user account; and
logging, at the document linking system, the second request with one or more credentials corresponding to the second user account in the document flow data structure.

17. A computer implemented method, comprising:
receiving, at a document linking system from a first user device, a document creation request via a user selection of a graphical user interface (GUI) object generated by the document linking system;
receiving, at the document linking system, a document from the first user device;
creating, at the document linking system, a first document token associated with the document, wherein the first document token is a hash of the document;
creating, at the document linking system, a graphical link corresponding to the first document token;
transmitting, from the document linking system, the graphical link to the first user device;
receiving, at the document linking system, an access request from a second client device via a scan of the graphical link using a camera on the second client device;
logging, at the document linking system, the access request with one or more credentials corresponding to the second client device;
transmitting, at the document linking system, the document to the second client device;
receiving, at the document linking system, a modification of a portion of the document;
logging, at the document linking system, the modification with one or more credentials corresponding to a user account in a document flow data structure tracking interactions with the document, wherein the document flow data structure is stored on a blockchain and tracks interaction types including document permission, user credentials, timestamp of interaction, acknowledgement of document receipt, acknowledgement of document execution, and the modification of the portion of the document; and generating, at the document linking system, a document flow report including all of the tracked interaction types for the document.

18. The computer implemented method of claim 17, wherein the graphical link is a two dimensional image.

19. The computer implemented method of claim 17, wherein the graphical link is a QR code.

20. The computer implemented method of claim 17, wherein the logging further comprises:

logging with the access request one or more location coordinates corresponding to a location of the second client device.

* * * * *